US012617972B2

(12) United States Patent
Hamer et al.

(10) Patent No.: US 12,617,972 B2
(45) Date of Patent: May 5, 2026

(54) ROOFING MATERIALS WITH ASPHALT SHINGLE WASTE

(71) Applicant: BMIC LLC, Dallas, TX (US)

(72) Inventors: Ann Hamer, Waxahachie, TX (US); Qian Qin, Plano, TX (US); Cynthia Shaha, Ferris, TX (US); Kevin Carr, Dallas, TX (US); Ramil Mercado, Waxahachie, TX (US); Jarod Krajca, Ennis, TX (US); Aziel Meza, Dallas, TX (US)

(73) Assignee: BMIC LLC, Dallas, TX (US)

( * ) Notice: Subject to any disclaimer, the term of this patent is extended or adjusted under 35 U.S.C. 154(b) by 434 days.

(21) Appl. No.: 18/474,991

(22) Filed: Sep. 26, 2023

(65) Prior Publication Data

US 2024/0101864 A1 Mar. 28, 2024

Related U.S. Application Data

(63) Continuation of application No. 18/088,361, filed on Dec. 23, 2022, now Pat. No. 11,802,219.
(Continued)

(51) Int. Cl.
*C09D 195/00* (2006.01)
*C08L 95/00* (2006.01)
(Continued)

(52) U.S. Cl.
CPC ............ *C09D 195/00* (2013.01); *C08L 95/00* (2013.01); *C09D 7/61* (2018.01); *C09D 7/65* (2018.01); *C08L 2205/025* (2013.01)

(58) Field of Classification Search
None
See application file for complete search history.

(56) References Cited

U.S. PATENT DOCUMENTS 3,026,568 A 3/1962 Moar
5,209,802 A 5/1993 Hannah et al.
(Continued)

FOREIGN PATENT DOCUMENTS

WO 2018/091769 A1 5/2018
WO 2018/094315 A2 5/2018
(Continued)

OTHER PUBLICATIONS

Pauli, Adam T., Asphalt Compatibility Testing Using the Automated Heithaus Titration Test, Western Research nstitute, 1996.
(Continued)

*Primary Examiner* — Colin W. Slifka
(74) *Attorney, Agent, or Firm* — GREENBERG TRAURIG, LLP

(57) ABSTRACT

A method comprises obtaining a virgin asphalt and obtaining an asphalt shingle waste. The asphalt shingle waste comprises 5 wt. % to 40 wt. % of asphalt based on the total weight of the asphalt shingle waste. The asphalt shingle waste comprises 60 wt. % to 95 wt. % of limestone, granules, and/or impurities based on the total weight of the asphalt shingle waste. The method comprises obtaining a phase modifier. The method comprises mixing the virgin asphalt, the asphalt shingle waste, and the phase modifier to form an asphalt mixture. The phase modifier is present in an amount of 0.25 wt. % to 25 wt. % based on the total weight of the asphalt mixture. The asphalt mixture is configured to be applied to a roof substrate to obtain a roofing shingle.

20 Claims, 3 Drawing Sheets

100

OBTAIN AN OXIDIZED ASPHALT WITH A PENETRATION AT 77 °F OF 15 OR LESS
105

OBTAIN A PHASE MODIFIER
110

MIX THE OXIDIZED ASPHALT WITH THE PHASE MODIFIER TO FORM AN ASPHALT MIXTURE
115

FORM A ROOFING SHINGLE FROM THE ASPHALT MIXTURE
120

Related U.S. Application Data

(60) Provisional application No. 63/420,958, filed on Oct. 31, 2022, provisional application No. 63/309,284, filed on Feb. 11, 2022.

(51) Int. Cl.

| | | |
|---|---|---|
| *C09D 7/61* | (2018.01) | |
| *C09D 7/65* | (2018.01) | |

(56) References Cited

U.S. PATENT DOCUMENTS

| | | | |
|---|---|---|---|
| 5,718,787 | A | 2/1998 | Gallagher et al. |
| 6,743,313 | B2 | 6/2004 | Mischo |
| 6,984,670 | B2 | 1/2006 | Meyers, III et al. |
| 7,052,635 | B2 | 5/2006 | Mischo |
| 7,297,301 | B1 | 11/2007 | Deschamps et al. |
| 7,891,590 | B2 | 2/2011 | Rasmussen |
| 7,913,940 | B2 | 3/2011 | Harmon |
| 8,083,166 | B2 | 12/2011 | Gould et al. |
| 8,162,242 | B2 | 4/2012 | Hofmann et al. |
| 8,177,152 | B2 | 5/2012 | Harmon |
| 8,186,610 | B2 | 5/2012 | Gould et al. |
| 8,210,458 | B2 | 7/2012 | Strasser et al. |
| 8,266,861 | B2 | 9/2012 | Koch et al. |
| 8,388,873 | B2 | 3/2013 | Hofmann et al. |
| 8,496,196 | B2 | 7/2013 | Zickell et al. |
| 8,664,303 | B2 | 3/2014 | Martin |
| 8,672,248 | B2 | 3/2014 | Zickell et al. |
| 8,673,427 | B2 | 3/2014 | Kalkanoglu et al. |
| 8,783,590 | B2 | 7/2014 | Zickell et al. |
| 8,789,773 | B2 | 7/2014 | Teeter, Jr. et al. |
| 8,814,464 | B2 | 8/2014 | McDade et al. |
| 8,919,681 | B1 | 12/2014 | Horton et al. |
| 9,156,035 | B1 | 10/2015 | Horton et al. |
| 9,181,456 | B2 | 11/2015 | Hong et al. |
| 9,227,196 | B2 | 1/2016 | Hassan et al. |
| 9,273,228 | B1 | 3/2016 | Hyer et al. |
| 9,295,992 | B2 | 3/2016 | Zickell |
| 9,382,423 | B2 | 7/2016 | Bolton et al. |
| 9,440,239 | B1 | 9/2016 | Horton et al. |
| 9,457,354 | B2 | 10/2016 | Svec et al. |
| 9,540,544 | B2 | 1/2017 | Kalkanoglu et al. |
| 9,550,311 | B1 | 1/2017 | Neel |
| 9,605,152 | B2 | 3/2017 | Ruan et al. |
| 9,834,895 | B2 | 12/2017 | Neel |
| 9,855,677 | B2 | 1/2018 | Brock et al. |
| 9,932,477 | B2 | 4/2018 | Liu et al. |
| 9,951,223 | B2 | 4/2018 | Gillespie et al. |
| 9,951,224 | B2 | 4/2018 | Russell |
| 10,030,145 | B2 | 7/2018 | Severance et al. |
| 10,196,783 | B2 | 2/2019 | Dempsey et al. |
| 10,323,149 | B2 | 6/2019 | Russell |
| 10,683,620 | B1 | 6/2020 | Kelley et al. |
| 10,696,868 | B2 | 6/2020 | Quinn et al. |
| 10,858,790 | B1 | 12/2020 | Kelley et al. |
| 11,059,976 | B2 | 7/2021 | Franzen et al. |
| 11,473,305 | B2 | 10/2022 | LaTorre et al. |
| 11,519,137 | B2 | 12/2022 | Kelley et al. |
| 2002/0066813 | A1 | 6/2002 | Mischo |
| 2008/0184661 | A1 | 8/2008 | Lombard |
| 2008/0314803 | A1 | 12/2008 | Burke |
| 2009/0054562 | A1 | 2/2009 | Martin |
| 2010/0064937 | A1 | 3/2010 | Harmon et al. |
| 2010/0307380 | A1 | 12/2010 | Fader |
| 2011/0041731 | A1 | 2/2011 | Lombard |
| 2011/0233105 | A1 | 9/2011 | Bailey |
| 2012/0164385 | A1 | 6/2012 | Heulings et al. |
| 2013/0008986 | A1 | 1/2013 | Zickell et al. |
| 2013/0022823 | A1 | 1/2013 | Franks, Sr. |
| 2013/0172452 | A1 | 7/2013 | Corcoran et al. |
| 2013/0199410 | A1 | 8/2013 | Maldonado et al. |
| 2013/0220175 | A1 | 8/2013 | Zickell |
| 2013/0307172 | A1 | 11/2013 | Seder et al. |
| 2013/0313344 | A1 | 11/2013 | Nykulin et al. |
| 2014/0014000 | A1 | 1/2014 | Franzen et al. |
| 2014/0097278 | A1 | 4/2014 | Zickell |
| 2014/0299018 | A1 | 10/2014 | Elseifi et al. |
| 2014/0331897 | A1 | 11/2014 | Elseifi |
| 2014/0373749 | A1 | 12/2014 | Zickell et al. |
| 2015/0252534 | A1 | 9/2015 | Dempsey et al. |
| 2016/0017148 | A1 | 1/2016 | Ruan et al. |
| 2016/0362338 | A1 | 12/2016 | Reinke et al. |
| 2016/0362339 | A1 | 12/2016 | Franzen et al. |
| 2017/0327664 | A1 | 11/2017 | Al-Mehthel et al. |
| 2018/0141866 | A1 | 5/2018 | Kotefski et al. |
| 2018/0186963 | A1 | 7/2018 | Kotefski et al. |
| 2018/0208771 | A1 | 7/2018 | Gillespie et al. |
| 2018/0243798 | A1 | 8/2018 | Abraham et al. |
| 2018/0334620 | A1 | 11/2018 | Kotefski et al. |
| 2019/0039105 | A1 | 2/2019 | Burns, Sr. et al. |
| 2019/0300427 | A1 | 10/2019 | Horton |
| 2019/0375940 | A1 | 12/2019 | Franzen et al. |
| 2021/0108416 | A1 | 4/2021 | Aschenbeck et al. |

FOREIGN PATENT DOCUMENTS

| | | | |
|---|---|---|---|
| WO | 2018/125952 | A1 | 7/2018 |
| WO | 2019/134729 | A1 | 7/2019 |

OTHER PUBLICATIONS

Schabron, John F., et al., Asphaltene Determinator Method for Automated On-Column Precipitation and Redissolution Jf Pericondensed Aromatic Asphaltene Components, Energy and Fuels, 2010, 24, 5984-5996.

10

OBTAIN A VIRGIN ASPHALT
15

OBTAIN AN ASPHALT SHINGLE WASTE
20

OBTAIN A PHASE MODIFIER
25

MIX THE VIRGIN ASPHALT, ASPHALT SHINGLE WASTE, AND
PHASE MODIFIER TO FORM AN ASPHALT MIXTURE
30

FORM A ROOFING SHINGLE FROM THE ASPHALT MIXTURE
35

50

OBTAIN AN UNOXIDIZED ASPHALT WITH A PENETRATION AT 77 °F OF 15 OR LESS
55

OBTAIN A PHASE MODIFIER
60

MIX THE UNOXIDIZED ASPHALT WITH THE PHASE MODIFIER TO FORM AN ASPHALT MIXTURE
65

FORM A ROOFING SHINGLE FROM THE ASPHALT MIXTURE
70

100

OBTAIN AN OXIDIZED ASPHALT WITH A PENETRATION AT 77 °F OF 15 OR LESS
105

OBTAIN A PHASE MODIFIER
110

MIX THE OXIDIZED ASPHALT WITH THE PHASE MODIFIER TO FORM AN ASPHALT MIXTURE
115

FORM A ROOFING SHINGLE FROM THE ASPHALT MIXTURE
120

ROOFING MATERIALS WITH ASPHALT SHINGLE WASTE

CROSS-REFERENCE TO RELATED APPLICATIONS

The present application is a continuation of U.S. patent application Ser. No. 18/088,361, filed Dec. 23, 2022, now U.S. Pat. No. 11,802,219 entitled "ROOFING MATERIALS WITH ASPHALT SHINGLE WASTE," which claims priority of U.S. Provisional Patent Application No. 63/309,284, filed Feb. 11, 2022, entitled "ROOFING SHINGLES WITH ASPHALT SHINGLE WASTE," and U.S. Provisional Patent Application No. 63/420,958, filed Oct. 31, 2022, entitled "ROOFING SHINGLES WITH ASPHALT SHINGLE WASTE," all of which are incorporated herein by reference in their respective entirety for all purposes.

FIELD

At least some embodiments disclosed herein relate generally to roofing shingles. More particularly, at least some embodiments disclosed herein relate to methods for making roofing shingles from asphalt shingle waste, asphalt recovered from asphalt shingle waste, or any combination thereof.

BACKGROUND

Significant amounts of asphalt shingle waste are generated in the U.S. each year.

SUMMARY

In some embodiments, a method comprises obtaining a virgin asphalt. In some embodiments, the method comprises obtaining an asphalt shingle waste. In some embodiments, the asphalt shingle waste comprises 5 wt. % to 40 wt. % of asphalt based on a total weight of the asphalt shingle waste. In some embodiments, the asphalt shingle waste comprises 60 wt. % to 95 wt. % of limestone, granules, and/or impurities based on the total weight of the asphalt shingle waste. In some embodiments, the method comprises obtaining a phase modifier. In some embodiments, the method comprises mixing the virgin asphalt, the asphalt shingle waste, and the phase modifier to form an asphalt mixture. In some embodiments, the phase modifier is present in an amount of 0.25 wt. % to 25 wt. % based on a total weight of the asphalt mixture. In some embodiments, the asphalt mixture is configured to be applied to a roof substrate to obtain a roofing shingle.

In some embodiments, the phase modifier is selected from the group consisting of pine chemical additives, renewable oils, and any combination thereof.

In some embodiments, the impurities are selected from the group consisting of fiberglass mat sand, fines, marker paint, sealant, one or more adhesives, tape, plastic debris, paper debris, soil, wood, nails, and any combination thereof.

In some embodiments, the phase modifier is present in an amount of 0.25 wt. % to 5 wt. % based on the total weight of the asphalt mixture. In some embodiments, the phase modifier is present in an amount of 0.25 wt. % to 3 wt. % based on the total weight of the asphalt mixture. In some embodiments, the phase modifier is present in an amount of 0.25 wt. % to 2 wt. % based on the total weight of the asphalt mixture.

In some embodiments, the virgin asphalt is present in an amount of 50 wt. % to 85 wt. % based on the total weight of the asphalt mixture. In some embodiments, the virgin asphalt is present in an amount of 60 wt. % to 80 wt. % based on the total weight of the asphalt mixture. In some embodiments, the virgin asphalt is present in an amount of 70 wt. % to 75 wt. % based on the total weight of the asphalt mixture.

In some embodiments, the asphalt shingle waste is present in an amount of 10 wt. % to 35 wt. % based on the total weight of the asphalt mixture. In some embodiments, the asphalt shingle waste is present in an amount of 20 wt. % to 30 wt. % based on the total weight of the asphalt mixture.

In some embodiments, a method comprises obtaining an unoxidized asphalt that has a penetration point at 77° F. of 15 dmm or less when tested according to ASTM D5. In some embodiments, the method comprises obtaining a phase modifier; and mixing the unoxidized asphalt with the phase modifier to form an asphalt mixture. In some embodiments, the phase modifier is present in an amount of 0.25 wt. % to 25 wt. % based on a total weight of the asphalt mixture. In some embodiments, the method comprises oxidizing the asphalt mixture. In some embodiments, the asphalt mixture as oxidized is configured to be applied to a roof substrate to obtain a roofing shingle.

In some embodiments, the unoxidized asphalt is present in an amount of 75 wt. % to 99 wt. % based on the total weight of the asphalt mixture. In some embodiments, the oxidized asphalt is present in an amount of 85 wt. % to 99 wt. % based on the total weight of the asphalt mixture. In some embodiments, the oxidized asphalt is present in an amount of 90 wt. % to 99 wt. % based on the total weight of the asphalt mixture. In some embodiments, the oxidized asphalt is present in an amount of 95 wt. % to 99 wt. % based on the total weight of the asphalt mixture.

In some embodiments, a method comprises obtaining an oxidized asphalt that has a penetration point at 77° F. of 15 dmm or less when tested according to ASTM D5. In some embodiments, the method comprises obtaining a phase modifier and mixing the oxidized asphalt with the phase modifier to form an asphalt mixture. In some embodiments, the phase modifier is added in a sufficient amount so as to increase the penetration of the asphalt at 77° F. by 15% to 30% when tested according to ASTM 3462. In some embodiments, the asphalt mixture is configured to be applied to a roof substrate to obtain a roofing shingle.

In some embodiments, the oxidized asphalt is present in an amount of 75 wt. % to 99 wt. % based on a total weight of the asphalt mixture. In some embodiments, the oxidized asphalt is present in an amount of 85 wt. % to 99 wt. % based on the total weight of the asphalt mixture. In some embodiments, the oxidized asphalt is present in an amount of 90 wt. % to 99 wt. % based on the total weight of the asphalt mixture. In some embodiments, the oxidized asphalt is present in an amount of 95 wt. % to 99 wt. % based on the total weight of the asphalt mixture.

In some embodiments, the phase modifier comprises one or more of a pine chemical additive, a renewable oil, or any combination thereof.

In some embodiments, the phase modifier is present in an amount of 0.25 wt. % to 25 wt. % based on the total weight of the asphalt mixture. In some embodiments, the phase modifier is present in an amount of 0.25 wt. % to 5 wt. % based on the total weight of the asphalt mixture. In some embodiments, the phase modifier is present in an amount of 0.25 wt. % to 3 wt. % based on the total weight of the asphalt mixture. In some embodiments, the phase modifier is present in an amount of 0.25 wt. % to 2 wt. % based on the total weight of the asphalt mixture.

BRIEF DESCRIPTION OF THE DRAWINGS

Reference is made to the drawings that form a part of this disclosure, and which illustrate embodiments in which the devices and methods described herein can be practiced.

Like reference numbers represent like parts throughout.

DETAILED DESCRIPTION

Figure 1:
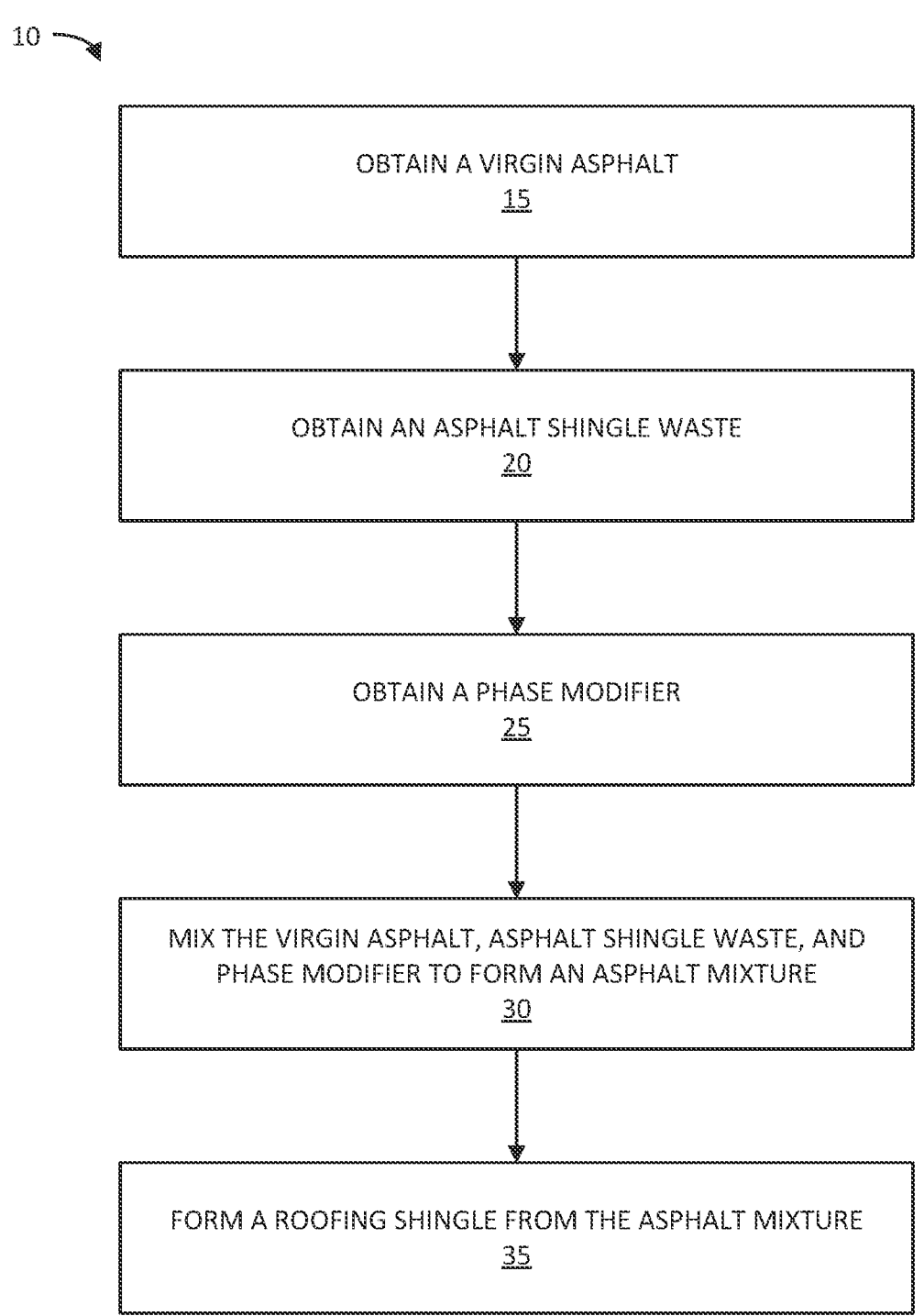
FIG. 1 shows a method, according to some embodiments.

Among those benefits and improvements that have been disclosed, other objects and advantages of this disclosure will become apparent from the following description taken in conjunction with the accompanying figures. Detailed embodiments of the present disclosure are disclosed herein; however, the disclosed embodiments are merely illustrative of the disclosure that may be embodied in various forms. In addition, each of the examples given regarding the various embodiments of the disclosure are intended to be illustrative, and not restrictive.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

All prior patents, publications, and test methods referenced herein are incorporated by reference in their entireties.

As used herein, "asphalt shingle waste" is defined as any form of discarded asphalt shingle. "Asphalt shingle waste" comprises, but is not limited to, post-manufacturing waste and post-consumer waste.

As used herein "post-consumer waste" is defined as any waste produced by an end consumer of a material stream. A non-limiting example of "post-consumer waste" is a discarded roofing shingle from a residential or commercial roof. Another non-limiting example of "post-consumer waste" is contractor waste including, but not limited to, surplus new material, damaged material, and scrap from cut shingles during installation. Yet another non-limiting example of "post-consumer waste" is at least one of: distributor waste, retail waste, or any combination thereof, including, but not limited to, damaged shingle products, aged inventory of shingles, and customer returns.

As used herein, "post-manufacturing waste" is defined as waste produced prior to reaching the end consumer of a material stream. A non-limiting example of "post-manufacturing waste" is any shingle waste generated during the production, handling, transportation, or other method of generation prior to installation on a roof of a consumer. Post-manufacturing waste may comprise production waste such as, but not limited to, partial shingles and coated fiberglass mat with or without granules.

As used herein, "asphalt shingle waste powder" is a mixture of particles produced by size reduction steps including, but not limited to, grinding, crushing, or disintegration, the like, or any combination thereof, of asphalt shingle waste.

As used herein, "waste asphalt" is defined as any form of asphalt that is obtained from asphalt shingle waste.

As used herein, a "briquette" broadly refers to any solid agglomeration of particles that comprises asphalt shingle waste powder, asphalt containing powder, or any combination thereof. In some embodiments, a briquette may comprise a binding agent. In some embodiments, a briquette may exclude binding agents. In some embodiments, in any method step where an asphalt shingle waste powder is used, the asphalt shingle waste powder may be partially or completely replaced with a plurality of briquettes.

As used herein the term "briquetting" refers to any process of forming a briquette. In some embodiments, a briquetting process may comprise compressing an asphalt shingle waste, an asphalt shingle waste powder, or any combination thereof, under sufficient pressure, so as to form a briquette. In some embodiments, a briquetting process may comprise the addition of a binding agent. In some embodiments, a briquetting process may exclude addition of any binding agents.

As used herein, "penetration point" is the vertical distance penetrated by the point of a standard needle into asphalt under specific conditions of load, time, and temperature. Penetration point is measured herein according to ASTM D5, unless expressly indicated otherwise.

As used herein, "virgin asphalt" refers to any form of asphalt that is not obtained from asphalt shingle waste. Examples of virgin asphalt comprise, but are not limited to, hot mix asphalt, warm mix asphalt, cold mix asphalt, sheet asphalt, high-modulus asphalt, or any combination thereof. In some embodiments, the virgin asphalt is an oxidized asphalt. In some embodiments, the virgin asphalt is an unoxidized asphalt.

As used herein, "impurities" refer to at least one of fiberglass mat, sand, fines, marker paint, sealant, one or more adhesives, tape, plastic debris, paper debris, soil, wood, nails, or any combination thereof.

As used herein, "phase modifier" refers to a substance that modifies at least one property of an asphalt. In some embodiments, the asphalt is an asphalt that would otherwise not be suitable for use in a roofing application, such as, for example and without limitation, a roofing shingle.

Embodiments of this disclosure can be used to form roofing shingles from asphalt generated from asphalt shingle waste, hard penetration point asphalt, or any combination thereof, by adding a phase modifier to the asphalt shingle waste or the hard penetration point asphalt. As an asphalt ages or oxidizes, the chemistry of that asphalt also changes or evolves. Asphalt is composed of four basic SARA fractions (saturates, asphaltenes, resins, and aromatics) separated by polarity, which combine to form a stable colloidal system. The asphaltenes, which are highly aromatic, contain more heteroatoms, and are higher in molecular weight, are dispersed in the maltene or solvent phase made up of the saturates, aromatics, and resins. The asphaltenes are the main contributor to the internal structure of an asphalt and they dominate the physical properties such as viscosity and rheology. Over time the asphalt in a shingle has undergone the oxidation/aging process described above. Moreover, hard penetration point asphalt also exhibits high concentrations of asphaltenes. Embodiments herein enable usage of the asphalt shingle waste and/or hard penetration point asphalt, by adding a phase modifier to the asphalt, which, in some embodiments, allows for the restoration of the maltene phase and helps re-establish the stable colloidal system.

In some embodiments, an asphalt mixture comprises at least one of a virgin asphalt, an asphalt shingle waste, a phase modifier, or any combination thereof.

In some embodiments, the virgin asphalt is present in an amount of 50 wt. % to 85 wt. % based on a total weight of the asphalt mixture. In some embodiments, the virgin asphalt is present in an amount of 55 wt. % to 85 wt. % based on the total weight of the asphalt mixture. In some embodiments, the virgin asphalt is present in an amount of 60 wt. % to 85 wt. % based on the total weight of the asphalt mixture. In some embodiments, the virgin asphalt is present in an amount of 65 wt. % to 85 wt. % based on the total weight of the asphalt mixture. In some embodiments, the virgin asphalt is present in an amount of 70 wt. % to 85 wt. % based on the total weight of the asphalt mixture. In some embodiments, the virgin asphalt is present in an amount of 75 wt. % to 85 wt. % based on the total weight of the asphalt mixture. In some embodiments, the virgin asphalt is present in an amount of 80 wt. % to 85 wt. % based on the total weight of the asphalt mixture.

In some embodiments, the virgin asphalt is present in an amount of 50 wt. % to 80 wt. % based on the total weight of the asphalt mixture. In some embodiments, the virgin asphalt is present in an amount of 50 wt. % to 75 wt. % based on the total weight of the asphalt mixture. In some embodiments, the virgin asphalt is present in an amount of 50 wt. % to 70 wt. % based on the total weight of the asphalt mixture. In some embodiments, the virgin asphalt is present in an amount of 50 wt. % to 65 wt. % based on the total weight of the asphalt mixture. In some embodiments, the virgin asphalt is present in an amount of 50 wt. % to 55 wt. % based on the total weight of the asphalt mixture.

In some embodiments, the virgin asphalt is present in an amount of 65 wt. % to 99 wt. % based on the total weight of the asphalt mixture. In some embodiments, the virgin asphalt is present in an amount of 65 wt. % to 95 wt. % based on the total weight of the asphalt mixture. In some embodiments, the virgin asphalt is present in an amount of 70 wt. % to 95 wt. % based on the total weight of the asphalt mixture. In some embodiments, the virgin asphalt is present in an amount of 75 wt. % to 95 wt. % based on the total weight of the asphalt mixture. In some embodiments, the virgin asphalt is present in an amount of 80 wt. % to 95 wt. % based on the total weight of the asphalt mixture. In some embodiments, the virgin asphalt is present in an amount of 85 wt. % to 95 wt. % based on the total weight of the asphalt mixture. In some embodiments, the virgin asphalt is present in an amount of 90 wt. % to 95 wt. % based on the total weight of the asphalt mixture. In some embodiments, the virgin asphalt is present in an amount of 75 wt. % to 90 wt. % based on the total weight of the asphalt mixture. In some embodiments, the virgin asphalt is present in an amount of 70 wt. % to 90 wt. % based on the total weight of the asphalt mixture. In some embodiments, the virgin asphalt is present in an amount of 70 wt. % to 85 wt. % based on the total weight of the asphalt mixture. In some embodiments, the virgin asphalt is present in an amount of 70 wt. % to 80 wt. % based on the total weight of the asphalt mixture. In some embodiments, the virgin asphalt is present in an amount of 70 wt. % to 75 wt. % based on the total weight of the asphalt mixture. In some embodiments, the virgin asphalt is present in an amount of 80 wt. % to 90 wt. % based on the total weight of the asphalt mixture.

In some embodiments, the asphalt shingle waste is present in an amount of 5 wt. % to 40 wt. % based on the total weight of the asphalt mixture. In some embodiments, the asphalt shingle waste is present in an amount of 10 wt. % to 40 wt. % based on the total weight of the asphalt mixture. In some embodiments, the asphalt shingle waste is present in an amount of 15 wt. % to 40 wt. % based on the total weight of the asphalt mixture. In some embodiments, the asphalt shingle waste is present in an amount of 20 wt. % to 40 wt. % based on the total weight of the asphalt mixture. In some embodiments, the asphalt shingle waste is present in an amount of 25 wt. % to 40 wt. % based on the total weight of the asphalt mixture. In some embodiments, the asphalt shingle waste is present in an amount of 30 wt. % to 40 wt. % based on the total weight of the asphalt mixture. In some embodiments, the asphalt shingle waste is present in an amount of 35 wt. % to 40 wt. % based on the total weight of the asphalt mixture.

In some embodiments, the asphalt shingle waste is present in an amount of 1 wt. % to 35 wt. % based on the total weight of the asphalt mixture. In some embodiments, the asphalt shingle waste is present in an amount of 1 wt. % to 30 wt. % based on the total weight of the asphalt mixture. In some embodiments, the asphalt shingle waste is present in an amount of 1 wt. % to 25 wt. % based on the total weight of the asphalt mixture. In some embodiments, the asphalt shingle waste is present in an amount of 5 wt. % to 30 wt. % based on the total weight of the asphalt mixture. In some embodiments, the asphalt shingle waste is present in an amount of 1 wt. % to 25 wt. % based on the total weight of the asphalt mixture. In some embodiments, the asphalt shingle waste is present in an amount of 5 wt. % to 35 wt. % based on the total weight of the asphalt mixture. In some embodiments, the asphalt shingle waste is present in an amount of 5 wt. % to 30 wt. % based on the total weight of the asphalt mixture. In some embodiments, the asphalt shingle waste is present in an amount of 5 wt. % to 25 wt. % based on the total weight of the asphalt mixture. In some embodiments, the asphalt shingle waste is present in an amount of 5 wt. % to 20 wt. % based on the total weight of the asphalt mixture. In some embodiments, the asphalt shingle waste is present in an amount of 5 wt. % to 15 wt. % based on the total weight of the asphalt mixture. In some embodiments, the asphalt shingle waste is present in an amount of 5 wt. % to 10 wt. % based on the total weight of the asphalt mixture.

In some embodiments, the asphalt shingle waste is present in an amount of 10 wt. % to 20 wt. % based on the total weight of the asphalt mixture. In some embodiments, the asphalt shingle waste is present in an amount of 10 wt. % to 25 wt. % based on the total weight of the asphalt mixture. In some embodiments, the asphalt shingle waste is present in an amount of 10 wt. % to 30 wt. % based on the total weight of the asphalt mixture. In some embodiments, the asphalt shingle waste is present in an amount of 10 wt. % to 35 wt. % based on the total weight of the asphalt mixture.

In some embodiments, the phase modifier is present in an amount of 0.1 wt. % to 25 wt. % based on the total weight of the asphalt mixture. In some embodiments, the phase modifier is present in an amount of 0.25 wt. % to 25 wt. % based on the total weight of the asphalt mixture. In some embodiments, the phase modifier is present in an amount of 0.5 wt. % to 25 wt. % based on the total weight of the asphalt mixture. In some embodiments, the phase modifier is present in an amount of 0.75 wt. % to 25 wt. % based on the total weight of the asphalt mixture. In some embodiments, the phase modifier is present in an amount of 1 wt. % to 25 wt. % based on the total weight of the asphalt mixture. In some embodiments, the phase modifier is present in an amount of 2 wt. % to 25 wt. % based on the total weight of the asphalt mixture. In some embodiments, the phase modifier is present in an amount of 3 wt. % to 25 wt. % based on the total weight of the asphalt mixture. In some embodiments, the phase modifier is present in an amount of 4 wt. % to 25 wt. % based on the total weight of the asphalt mixture. In some embodiments, the phase modifier is present in an amount of 5 wt. % to 25 wt. % based on the total weight of the asphalt mixture. In some embodiments, the phase modifier is present in an amount of 10 wt. % to 25 wt. % based on the total weight of the asphalt mixture. In some embodiments, the phase modifier is present in an amount of 15 wt. % to 25 wt. % based on the total weight of the asphalt mixture. In some embodiments, the phase modifier is present in an amount of 20 wt. % to 25 wt. % based on the total weight of the asphalt mixture.

In some embodiments, the phase modifier is present in an amount of 0.25 wt. % to 20 wt. % based on the total weight of the asphalt mixture. In some embodiments, the phase modifier is present in an amount of 0.25 wt. % to 15 wt. % based on the total weight of the asphalt mixture. In some embodiments, the phase modifier is present in an amount of 0.25 wt. % to 10 wt. % based on the total weight of the asphalt mixture. In some embodiments, the phase modifier is present in an amount of 0.25 wt. % to 5 wt. % based on the total weight of the asphalt mixture. In some embodiments, the phase modifier is present in an amount of 0.25 wt. % to 4 wt. % based on the total weight of the asphalt mixture. In some embodiments, the phase modifier is present in an amount of 0.25 wt. % to 3 wt. % based on the total weight of the asphalt mixture. In some embodiments, the phase modifier is present in an amount of 0.25 wt. % to 2 wt. % based on the total weight of the asphalt mixture. In some embodiments, the phase modifier is present in an amount of 0.25 wt. % to 1 wt. % based on the total weight of the asphalt mixture. In some embodiments, the phase modifier is present in an amount of 0.25 wt. % to 0.75 wt. % based on the total weight of the asphalt mixture. In some embodiments, the phase modifier is present in an amount of 0.25 wt. % to 0.5 wt. % based on the total weight of the asphalt mixture.

In some embodiments, the phase modifier is present in an amount of 0.1 wt. % to 10 wt. % based on the total weight of the asphalt mixture. In some embodiments, the phase modifier is present in an amount of 0.1 wt. % to 9 wt. % based on the total weight of the asphalt mixture. In some embodiments, the phase modifier is present in an amount of 0.1 wt. % to 8 wt. % based on the total weight of the asphalt mixture. In some embodiments, the phase modifier is present in an amount of 0.1 wt. % to 7 wt. % based on the total weight of the asphalt mixture. In some embodiments, the phase modifier is present in an amount of 0.1 wt. % to 6 wt. % based on the total weight of the asphalt mixture. In some embodiments, the phase modifier is present in an amount of 0.1 wt. % to 5 wt. % based on the total weight of the asphalt mixture. In some embodiments, the phase modifier is present in an amount of 0.1 wt. % to 4 wt. % based on the total weight of the asphalt mixture.

In some embodiments, the phase modifier is present in an amount of 0.1 wt. % to 3 wt. % based on the total weight of the asphalt mixture. In some embodiments, the phase modifier is present in an amount of 0.1 wt. % to 2.5 wt. % based on the total weight of the asphalt mixture. In some embodiments, the phase modifier is present in an amount of 0.1 wt. % to 2 wt. % based on the total weight of the asphalt mixture. In some embodiments, the phase modifier is present in an amount of 0.1 wt. % to 1.5 wt. % based on the total weight of the asphalt mixture. In some embodiments, the phase modifier is present in an amount of 0.1 wt. % to 1 wt. % based on the total weight of the asphalt mixture. In some embodiments, the phase modifier is present in an amount of 0.1 wt. % to 0.5 wt. % based on the total weight of the asphalt mixture. In some embodiments, the phase modifier is present in an amount of 1 wt. % to 3 wt. % based on the total weight of the asphalt mixture. In some embodiments, the phase modifier is present in an amount of 0.1 wt. % to 0.5 wt. % based on the total weight of the asphalt mixture.

In some embodiments, a waste asphalt is present in the asphalt shingle waste in an amount of 5 wt. % to 40 wt. % based on a total weight of the asphalt shingle waste. In some embodiments, the waste asphalt is present in the asphalt shingle waste in an amount of 10 wt. % to 40 wt. % based on the total weight of the asphalt shingle waste. In some embodiments, the waste asphalt is present in the asphalt shingle waste in an amount of 15 wt. % to 40 wt. % based on the total weight of the asphalt shingle waste. In some embodiments, the waste asphalt is present in the asphalt shingle waste in an amount of 20 wt. % to 40 wt. % based on the total weight of the asphalt shingle waste. In some embodiments, the waste asphalt is present in the asphalt shingle waste in an amount of 25 wt. % to 40 wt. % based on the total weight of the asphalt shingle waste. In some embodiments, the waste asphalt is present in the asphalt shingle waste in an amount of 30 wt. % to 40 wt. % based on the total weight of the asphalt shingle waste. In some embodiments, the waste asphalt is present in the asphalt shingle waste in an amount of 35 wt. % to 40 wt. % based on the total weight of the asphalt shingle waste.

In some embodiments, the waste asphalt is present in the asphalt shingle waste in an amount of 5 wt. % to 35 wt. % based on the total weight of the asphalt shingle waste. In some embodiments, the waste asphalt is present in the asphalt shingle waste in an amount of 5 wt. % to 30 wt. % based on the total weight of the asphalt shingle waste. In some embodiments, the waste asphalt is present in the asphalt shingle waste in an amount of 5 wt. % to 25 wt. % based on the total weight of the asphalt shingle waste. In some embodiments, the waste asphalt is present in the asphalt shingle waste in an amount of 5 wt. % to 20 wt. % based on the total weight of the asphalt shingle waste. In some embodiments, the waste asphalt is present in the asphalt shingle waste in an amount of 5 wt. % to 15 wt. % based on the total weight of the asphalt shingle waste. In some embodiments, the waste asphalt is present in the asphalt shingle waste in an amount of 5 wt. % to 10 wt. % based on the total weight of the asphalt shingle waste.

In some embodiments, the waste asphalt is present in the asphalt shingle waste in an amount of 10 wt. % to 35 wt. % based on the total weight of the asphalt shingle waste. In some embodiments, the waste asphalt is present in the asphalt shingle waste in an amount of 15 wt. % to 30 wt. % based on the total weight of the asphalt shingle waste. In some embodiments, the waste asphalt is present in the asphalt shingle waste in an amount of 20 wt. % to 25 wt. % based on the total weight of the asphalt shingle waste. In some embodiments, the waste asphalt is present in the asphalt shingle waste in an amount of 5 wt. % to 99 wt. % based on the total weight of the asphalt shingle waste.

In some embodiments, the asphalt shingle waste is in the form of a briquette.

In some embodiments, limestone powder, granules, and/or impurities are present in the asphalt shingle waste in an amount of 60 wt. % to 95 wt. % based on the total weight of the asphalt shingle waste. In some embodiments, limestone powder, granules, and/or impurities are present in the asphalt shingle waste in an amount of 65 wt. % to 95 wt. % based on the total weight of the asphalt shingle waste. In some embodiments, limestone powder, granules, and/or impurities are present in the asphalt shingle waste in an amount of 70 wt. % to 95 wt. % based on the total weight of the asphalt shingle waste. In some embodiments, limestone powder, granules, and/or impurities are present in the asphalt shingle waste in an amount of 75 wt. % to 95 wt. % based on the total weight of the asphalt shingle waste. In some embodiments, limestone powder, granules, and/or impurities are present in the asphalt shingle waste in an amount of 80 wt. % to 95 wt. % based on the total weight of the asphalt shingle waste. In some embodiments, limestone powder, granules, and/or impurities are present in the asphalt shingle waste in an amount of 85 wt. % to 95 wt. % based on the total weight of the asphalt shingle waste. In some embodiments, limestone powder, granules, and/or impurities are present in the asphalt shingle waste in an amount of 90 wt. % to 95 wt. % based on the total weight of the asphalt shingle waste.

In some embodiments, limestone powder, granules, and/or impurities are present in the asphalt shingle waste in an amount of 60 wt. % to 90 wt. % based on the total weight of the asphalt shingle waste. In some embodiments, limestone powder, granules, and/or impurities are present in the asphalt shingle waste in an amount of 60 wt. % to 85 wt. % based on the total weight of the asphalt shingle waste. In some embodiments, limestone powder, granules, and/or impurities are present in the asphalt shingle waste in an amount of 60 wt. % to 80 wt. % based on the total weight of the asphalt shingle waste. In some embodiments, limestone powder, granules, and/or impurities are present in the asphalt shingle waste in an amount of 60 wt. % to 75 wt. % based on the total weight of the asphalt shingle waste. In some embodiments, limestone powder, granules, and/or impurities are present in the asphalt shingle waste in an amount of 60 wt. % to 70 wt. % based on the total weight of the asphalt shingle waste. In some embodiments, limestone powder, granules, and/or impurities are present in the asphalt shingle waste in an amount of 60 wt. % to 65 wt. % based on the total weight of the asphalt shingle waste.

In some embodiments, limestone powder, granules, and/or impurities are present in the asphalt shingle waste in an amount of 65 wt. % to 90 wt. % based on the total weight of the asphalt shingle waste. In some embodiments, limestone powder, granules, and/or impurities are present in the asphalt shingle waste in an amount of 70 wt. % to 85 wt. % based on the total weight of the asphalt shingle waste. In some embodiments, limestone powder, granules, and/or impurities are present in the asphalt shingle waste in an amount of 75 wt. % to 80 wt. % based on the total weight of the asphalt shingle waste.

In some embodiments, the phase modifier is combined with the asphalt to modify at least one of a softening point, a penetration, a viscosity, or any combination thereof, of the asphalt. In some embodiments, the phase modifier is combined with the asphalt to modify at least one of an asphaltene fraction of the asphalt, a resin fraction of the asphalt, an aromatic fraction of the asphalt, a saturate fraction of the asphalt, or any combination thereof.

In some embodiments, the phase modifier can comprise a pine chemical additive. In some embodiments, the pine chemical additive can be derived from Crude Tall Oil that is a renewable raw material and a by-product of the paper industry.

In some embodiments, the phase modifier can comprise a renewable oil that can stabilize asphaltenes for improved compatibility with the maltene phase.

In some embodiments, the asphalt mixture comprises an oxidized asphalt that has a penetration point at 77° F. of 15 dmm or less when tested according to ASTM D5, and the phase modifier.

In some embodiments, the oxidized asphalt is present in an amount of 75 wt. % to 99 wt. % based on the total weight of the asphalt mixture. In some embodiments, the oxidized asphalt is present in an amount of 80 wt. % to 99 wt. % based on the total weight of the asphalt mixture. In some embodiments, the oxidized asphalt is present in an amount of 85 wt. % to 99 wt. % based on the total weight of the asphalt mixture. In some embodiments, the oxidized asphalt is present in an amount of 90 wt. % to 99 wt. % based on the total weight of the asphalt mixture. In some embodiments, the oxidized asphalt is present in an amount of 91 wt. % to 99 wt. % based on the total weight of the asphalt mixture. In some embodiments, the oxidized asphalt is present in an amount of 92 wt. % to 99 wt. % based on the total weight of the asphalt mixture. In some embodiments, the oxidized asphalt is present in an amount of 93 wt. % to 99 wt. % based on the total weight of the asphalt mixture. In some embodiments, the oxidized asphalt is present in an amount of 94 wt. % to 99 wt. % based on the total weight of the asphalt mixture. In some embodiments, the oxidized asphalt is present in an amount of 95 wt. % to 99 wt. % based on the total weight of the asphalt mixture. In some embodiments, the oxidized asphalt is present in an amount of 96 wt. % to 99 wt. % based on the total weight of the asphalt mixture. In some embodiments, the oxidized asphalt is present in an amount of 97 wt. % to 99 wt. % based on the total weight of the asphalt mixture. In some embodiments, the oxidized asphalt is present in an amount of 98 wt. % to 99 wt. % based on the total weight of the asphalt mixture.

In some embodiments, the oxidized asphalt is present in an amount of 75 wt. % to 98 wt. % based on the total weight of the asphalt mixture. In some embodiments, the oxidized asphalt is present in an amount of 75 wt. % to 97 wt. % based on the total weight of the asphalt mixture. In some embodiments, the oxidized asphalt is present in an amount of 75 wt. % to 96 wt. % based on the total weight of the asphalt mixture. In some embodiments, the oxidized asphalt is present in an amount of 75 wt. % to 95 wt. % based on the total weight of the asphalt mixture. In some embodiments, the oxidized asphalt is present in an amount of 75 wt. % to 94 wt. % based on the total weight of the asphalt mixture. In some embodiments, the oxidized asphalt is present in an amount of 75 wt. % to 93 wt. % based on the total weight of the asphalt mixture. In some embodiments, the oxidized asphalt is present in an amount of 75 wt. % to 92 wt. % based on the total weight of the asphalt mixture. In some embodiments, the oxidized asphalt is present in an amount of 75 wt. % to 91 wt. % based on the total weight of the asphalt mixture. In some embodiments, the oxidized asphalt is present in an amount of 75 wt. % to 90 wt. % based on the total weight of the asphalt mixture. In some embodiments, the oxidized asphalt is present in an amount of 75 wt. % to 85 wt. % based on the total weight of the asphalt mixture. In some embodiments, the oxidized asphalt is present in an amount of 75 wt. % to 80 wt. % based on the total weight of the asphalt mixture.

In some embodiments, the asphalt mixture comprises the oxidized asphalt and the phase modifier present in an amount of 0.25 wt. % to 25 wt. % based on the total weight of the asphalt mixture. In some embodiments, the asphalt mixture comprises the oxidized asphalt and the phase modifier present in an amount of 0.5 wt. % to 25 wt. % based on the total weight of the asphalt mixture. In some embodiments, the asphalt mixture comprises the oxidized asphalt and the phase modifier present in an amount of 0.75 wt. % to 25 wt. % based on the total weight of the asphalt mixture. In some embodiments, the asphalt mixture comprises the oxidized asphalt and the phase modifier present in an amount of 1 wt. % to 25 wt. % based on the total weight of the asphalt mixture. In some embodiments, the phase modifier is present in an amount of 2 wt. % to 25 wt. % based on the total weight of the asphalt mixture. In some embodiments, the phase modifier is present in an amount of 3 wt. % to 25 wt. % based on the total weight of the asphalt mixture. In some embodiments, the phase modifier is present in an amount of 4 wt. % to 25 wt. % based on the total weight of the asphalt mixture. In some embodiments, the phase modifier is present in an amount of 5 wt. % to 25 wt. % based on the total weight of the asphalt mixture. In some embodiments, the phase modifier is present in an amount of 10 wt. % to 25 wt. % based on the total weight of the asphalt mixture. In some embodiments, the phase modifier is present in an amount of 15 wt. % to 25 wt. % based on the total weight of the asphalt mixture. In some embodiments, the phase modifier is present in an amount of 20 wt. % to 25 wt. % based on the total weight of the asphalt mixture.

In some embodiments, the asphalt mixture comprises the oxidized asphalt and the phase modifier present in an amount of 0.25 wt. % to 20 wt. % based on the total weight of the asphalt mixture. In some embodiments, the phase modifier is present in an amount of 0.25 wt. % to 15 wt. % based on the total weight of the asphalt mixture. In some embodiments, the phase modifier is present in an amount of 0.25 wt. % to 10 wt. % based on the total weight of the asphalt mixture. In some embodiments, the phase modifier is present in an amount of 0.25 wt. % to 5 wt. % based on the total weight of the asphalt mixture. In some embodiments, the phase modifier is present in an amount of 0.25 wt. % to 4 wt. % based on the total weight of the asphalt mixture. In some embodiments, the phase modifier is present in an amount of 0.25 wt. % to 3 wt. % based on the total weight of the asphalt mixture. In some embodiments, the phase modifier is present in an amount of 0.25 wt. % to 2 wt. % based on the total weight of the asphalt mixture. In some embodiments, the phase modifier is present in an amount of 0.25 wt. % to 1 wt. % based on the total weight of the asphalt mixture. In some embodiments, the phase modifier is present in an amount of 0.25 wt. % to 0.75 wt. % based on the total weight of the asphalt mixture. In some embodiments, the phase modifier is present in an amount of 0.25 wt. % to 0.5 wt. % based on the total weight of the asphalt mixture.

In some embodiments, the asphalt mixture can comprise an unoxidized asphalt that has a penetration point at 77° F. of 15 dmm or less when tested according to ASTM D5, and the phase modifier. In such embodiments, the asphalt mixture can be oxidized after the unoxidized asphalt and the phase modifier are combined.

In some embodiments, the unoxidized asphalt is present in an amount of 75 wt. % to 99 wt. % based on the total weight of the asphalt mixture. In some embodiments, the unoxidized asphalt is present in an amount of 80 wt. % to 99 wt. % based on the total weight of the asphalt mixture. In some embodiments, the unoxidized asphalt is present in an amount of 85 wt. % to 99 wt. % based on the total weight of the asphalt mixture. In some embodiments, the unoxidized asphalt is present in an amount of 90 wt. % to 99 wt. % based on the total weight of the asphalt mixture. In some embodiments, the unoxidized asphalt is present in an amount of 91 wt. % to 99 wt. % based on the total weight of the asphalt mixture. In some embodiments, the unoxidized asphalt is present in an amount of 92 wt. % to 99 wt. % based on the total weight of the asphalt mixture. In some embodiments, the unoxidized asphalt is present in an amount of 93 wt. % to 99 wt. % based on the total weight of the asphalt mixture. In some embodiments, the unoxidized asphalt is present in an amount of 94 wt. % to 99 wt. % based on the total weight of the asphalt mixture. In some embodiments, the unoxidized asphalt is present in an amount of 95 wt. % to 99 wt. % based on the total weight of the asphalt mixture. In some embodiments, the unoxidized asphalt is present in an amount of 96 wt. % to 99 wt. % based on the total weight of the asphalt mixture. In some embodiments, the unoxidized asphalt is present in an amount of 97 wt. % to 99 wt. % based on the total weight of the asphalt mixture. In some embodiments, the unoxidized asphalt is present in an amount of 98 wt. % to 99 wt. % based on the total weight of the asphalt mixture.

In some embodiments, the unoxidized asphalt is present in an amount of 75 wt. % to 98 wt. % based on the total weight of the asphalt mixture. In some embodiments, the unoxidized asphalt is present in an amount of 75 wt. % to 97 wt. % based on the total weight of the asphalt mixture. In some embodiments, the unoxidized asphalt is present in an amount of 75 wt. % to 96 wt. % based on the total weight of the asphalt mixture. In some embodiments, the unoxidized asphalt is present in an amount of 75 wt. % to 95 wt. % based on the total weight of the asphalt mixture. In some embodiments, the unoxidized asphalt is present in an amount of 75 wt. % to 94 wt. % based on the total weight of the asphalt mixture. In some embodiments, the unoxidized asphalt is present in an amount of 75 wt. % to 93 wt. % based on the total weight of the asphalt mixture. In some embodiments, the unoxidized asphalt is present in an amount of 75 wt. % to 92 wt. % based on the total weight of the asphalt mixture. In some embodiments, the unoxidized asphalt is present in an amount of 75 wt. % to 91 wt. % based on the total weight of the asphalt mixture. In some embodiments, the unoxidized asphalt is present in an amount of 75 wt. % to 90 wt. % based on the total weight of the asphalt mixture. In some embodiments, the unoxidized asphalt is present in an amount of 75 wt. % to 85 wt. % based on the total weight of the asphalt mixture. In some embodiments, the unoxidized asphalt is present in an amount of 75 wt. % to 80 wt. % based on the total weight of the asphalt mixture.

In some embodiments, the asphalt mixture comprises the unoxidized asphalt and the phase modifier present in an amount of 0.25 wt. % to 25 wt. % based on the total weight of the asphalt mixture. In some embodiments, the asphalt mixture comprises the unoxidized asphalt and the phase modifier present in an amount of 0.5 wt. % to 25 wt. % based on the total weight of the asphalt mixture. In some embodiments, the asphalt mixture comprises the unoxidized asphalt and the phase modifier present in an amount of 0.75 wt. % to 25 wt. % based on the total weight of the asphalt mixture. In some embodiments, the asphalt mixture comprises the unoxidized asphalt and the phase modifier present in an amount of 1 wt. % to 25 wt. % based on the total weight of the asphalt mixture. In some embodiments, the phase modifier is present in an amount of 2 wt. % to 25 wt. % based on the total weight of the asphalt mixture. In some embodiments, the phase modifier is present in an amount of 3 wt. % to 25 wt. % based on the total weight of the asphalt mixture. In some embodiments, the phase modifier is present in an amount of 4 wt. % to 25 wt. % based on the total weight of the asphalt mixture. In some embodiments, the phase modifier is present in an amount of 5 wt. % to 25 wt. % based on the total weight of the asphalt mixture. In some embodiments, the phase modifier is present in an amount of 10 wt. % to 25 wt. % based on the total weight of the asphalt mixture. In some embodiments, the phase modifier is present in an amount of 15 wt. % to 25 wt. % based on the total weight of the asphalt mixture. In some embodiments, the phase modifier is present in an amount of 20 wt. % to 25 wt. % based on the total weight of the asphalt mixture.

In some embodiments, the asphalt mixture comprises the unoxidized asphalt and the phase modifier present in an amount of 0.25 wt. % to 20 wt. % based on the total weight of the asphalt mixture. In some embodiments, the phase modifier is present in an amount of 0.25 wt. % to 15 wt. % based on the total weight of the asphalt mixture. In some embodiments, the phase modifier is present in an amount of 0.25 wt. % to 10 wt. % based on the total weight of the asphalt mixture. In some embodiments, the phase modifier is present in an amount of 0.25 wt. % to 5 wt. % based on the total weight of the asphalt mixture. In some embodiments, the phase modifier is present in an amount of 0.25 wt. % to 4 wt. % based on the total weight of the asphalt mixture. In some embodiments, the phase modifier is present in an amount of 0.25 wt. % to 3 wt. % based on the total weight of the asphalt mixture. In some embodiments, the phase modifier is present in an amount of 0.25 wt. % to 2 wt. % based on the total weight of the asphalt mixture. In some embodiments, the phase modifier is present in an amount of 0.25 wt. % to 1 wt. % based on the total weight of the asphalt mixture. In some embodiments, the phase modifier is present in an amount of 0.25 wt. % to 0.75 wt. % based on the total weight of the asphalt mixture. In some embodiments, the phase modifier is present in an amount of 0.25 wt. % to 0.5 wt. % based on the total weight of the asphalt mixture.

In some embodiments, the asphalt mixture can comprise at least one filler.

In some embodiments, the at least one filler comprises at least one of limestone, glass, calcium carbonate, barium sulfate, calcium sulfate, talc, perlite, silica, fumed silica, precipitated silica, quartz, aluminum trihydrate, magnesium hydroxide, ammonium polyphosphate, colemanite, titanium dioxide, calcium sulfate, fly ash, graphene nanoparticles, carbon black, recycled rubber tires, recycled thermoplastic resins, basalt, roofing granules, graphite, clay, impurities, or any combination thereof.

In some embodiments, the at least one filler can be present in an amount of 10 wt. % to 70 wt. % based on the total weight of the asphalt mixture. In some embodiments, the at least one filler can be present in an amount of 10 wt. % to 65 wt. % based on the total weight of the asphalt mixture. In some embodiments, the at least one filler can be present in an amount of 10 wt. % to 60 wt. % based on the total weight of the asphalt mixture. In some embodiments, the at least one filler can be present in an amount of 10 wt. % to 55 wt. % based on the total weight of the asphalt mixture. In some embodiments, the at least one filler can be present in an amount of 10 wt. % to 50 wt. % based on the total weight of the asphalt mixture. In some embodiments, the at least one filler can be present in an amount of 10 wt. % to 45 wt. % based on the total weight of the asphalt mixture. In some embodiments, the at least one filler can be present in an amount of 10 wt. % to 40 wt. % based on the total weight of the asphalt mixture. In some embodiments, the at least one filler can be present in an amount of 10 wt. % to 35 wt. % based on the total weight of the asphalt mixture. In some embodiments, the at least one filler can be present in an amount of 10 wt. % to 30 wt. % based on the total weight of the asphalt mixture.

In some embodiments, the at least one filler can be present in an amount of 15 wt. % to 70 wt. % based on the total weight of the asphalt mixture. In some embodiments, the at least one filler can be present in an amount of 20 wt. % to 70 wt. % based on the total weight of the asphalt mixture. In some embodiments, the at least one filler can be present in an amount of 25 wt. % to 70 wt. % based on the total weight of the asphalt mixture. In some embodiments, the at least one filler can be present in an amount of 30 wt. % to 70 wt. % based on the total weight of the asphalt mixture. In some embodiments, the at least one filler can be present in an amount of 35 wt. % to 70 wt. % based on the total weight of the asphalt mixture. In some embodiments, the at least one filler can be present in an amount of 40 wt. % to 70 wt. % based on the total weight of the asphalt mixture. In some embodiments, the at least one filler can be present in an amount of 45 wt. % to 70 wt. % based on the total weight of the asphalt mixture. In some embodiments, the at least one filler can be present in an amount of 50 wt. % to 70 wt. % based on the total weight of the asphalt mixture. In some embodiments, the at least one filler can be present in an amount of 55 wt. % to 70 wt. % based on the total weight of the asphalt mixture. In some embodiments, the at least one filler can be present in an amount of 60 wt. % to 70 wt. % based on the total weight of the asphalt mixture.

In some embodiments, the asphalt mixture does not comprise a paving grade asphalt. In some embodiments, the asphalt shingle waste does not comprise a paving grade asphalt. In some embodiments, the virgin asphalt does not comprise a paving grade asphalt.

In some embodiments, the asphalt mixture is an asphalt coating. In some embodiments, the asphalt mixture is an asphalt filled coating. In some embodiments, the asphalt mixture is an asphalt shingle waste filled coating. In some embodiments, the asphalt mixture is incorporated into an asphalt coating. In some embodiments, the asphalt mixture is incorporated into an asphalt shingle waste filled coating.

In some embodiments, the asphalt shingle waste filled coating comprises the asphalt mixture.

In some embodiments, the asphalt shingle waste filled coating comprises 10% to 90% by weight of the asphalt mixture based on a total weight of the asphalt shingle waste filled coating. In some embodiments, the asphalt shingle waste filled coating comprises 10% to 85% by weight of the asphalt mixture based on the total weight of the asphalt shingle waste filled coating. In some embodiments, the asphalt shingle waste filled coating comprises 10% to 80% by weight of the asphalt mixture based on the total weight of the asphalt shingle waste filled coating. In some embodiments, the asphalt shingle waste filled coating comprises 10% to 75% by weight of the asphalt mixture based on the total weight of the asphalt shingle waste filled coating. In some embodiments, the asphalt shingle waste filled coating comprises 10% to 70% by weight of the asphalt mixture based on the total weight of the asphalt shingle waste filled coating. In some embodiments, the asphalt shingle waste filled coating comprises 10% to 65% by weight of the asphalt mixture based on the total weight of the asphalt shingle waste filled coating. In some embodiments, the asphalt shingle waste filled coating comprises 10% to 60% by weight of the asphalt mixture based on the total weight of the asphalt shingle waste filled coating. In some embodiments, the asphalt shingle waste filled coating comprises 10% to 55% by weight of the asphalt mixture based on the total weight of the asphalt shingle waste filled coating.

In some embodiments, the asphalt shingle waste filled coating comprises 10% to 50% by weight of the asphalt mixture based on the total weight of the asphalt shingle waste filled coating. In some embodiments, the asphalt shingle waste filled coating comprises 10% to 45% by weight of the asphalt mixture based on the total weight of the asphalt shingle waste filled coating. In some embodiments, the asphalt shingle waste filled coating comprises 10% to 40% by weight of the asphalt mixture based on the total weight of the asphalt shingle waste filled coating. In some embodiments, the asphalt shingle waste filled coating comprises 10% to 35% by weight of the asphalt mixture based on the total weight of the asphalt shingle waste filled coating. In some embodiments, the asphalt shingle waste filled coating comprises 10% to 30% by weight of the asphalt mixture based on the total weight of the asphalt shingle waste filled coating. In some embodiments, the asphalt shingle waste filled coating comprises 10% to 25% by weight of the asphalt mixture based on the total weight of the asphalt shingle waste filled coating. In some embodiments, the asphalt shingle waste filled coating comprises 10% to 20% by weight of the asphalt mixture based on the total weight of the asphalt shingle waste filled coating. In some embodiments, the asphalt shingle waste filled coating comprises 10% to 15% by weight of the asphalt mixture based on the total weight of the asphalt shingle waste filled coating.

In some embodiments, the asphalt shingle waste filled coating comprises 15% to 90% by weight of the asphalt mixture based on the total weight of the asphalt shingle waste filled coating. In some embodiments, the asphalt shingle waste filled coating comprises 20% to 90% by weight of the asphalt mixture based on the total weight of the asphalt shingle waste filled coating. In some embodiments, the asphalt shingle waste filled coating comprises 25% to 90% by weight of the asphalt mixture based on the total weight of the asphalt shingle waste filled coating. In some embodiments, the asphalt shingle waste filled coating comprises 30% to 90% by weight of the asphalt mixture based on the total weight of the asphalt shingle waste filled coating. In some embodiments, the asphalt shingle waste filled coating comprises 35% to 90% by weight of the asphalt mixture based on the total weight of the asphalt shingle waste filled coating. In some embodiments, the asphalt shingle waste filled coating comprises 40% to 90% by weight of the asphalt mixture based on the total weight of the asphalt shingle waste filled coating. In some embodiments, the asphalt shingle waste filled coating comprises 45% to 90% by weight of the asphalt mixture based on the total weight of the asphalt shingle waste filled coating. In some embodiments, the asphalt shingle waste filled coating comprises 50% to 90% by weight of the asphalt mixture based on the total weight of the asphalt shingle waste filled coating.

In some embodiments, the asphalt shingle waste filled coating comprises 55% to 90% by weight of the asphalt mixture based on the total weight of the asphalt shingle waste filled coating. In some embodiments, the asphalt shingle waste filled coating comprises 60% to 90% by weight of the asphalt mixture based on the total weight of the asphalt shingle waste filled coating. In some embodiments, the asphalt shingle waste filled coating comprises 65% to 90% by weight of the asphalt mixture based on the total weight of the asphalt shingle waste filled coating. In some embodiments, the asphalt shingle waste filled coating comprises 70% to 90% by weight of the asphalt mixture based on the total weight of the asphalt shingle waste filled coating. In some embodiments, the asphalt shingle waste filled coating comprises 75% to 90% by weight of the asphalt mixture based on the total weight of the asphalt shingle waste filled coating. In some embodiments, the asphalt shingle waste filled coating comprises 80% to 90% by weight of the asphalt mixture based on the total weight of the asphalt shingle waste filled coating. In some embodiments, the asphalt shingle waste filled coating comprises 85% to 90% by weight of the asphalt mixture based on the total weight of the asphalt shingle waste filled coating.

In some embodiments, the asphalt shingle waste filled coating comprises an asphalt, wherein the asphalt comprises at least one of the virgin asphalt, the waste asphalt, or any combination thereof.

In some embodiments, the asphalt shingle waste filled coating comprises 20% to 70% by weight of the asphalt based on the total weight of the asphalt shingle waste filled coating. In some embodiments, the asphalt shingle waste filled coating comprises 20% to 60% by weight of the asphalt based on the total weight of the asphalt shingle waste filled coating. In some embodiments, the asphalt shingle waste filled coating comprises 20% to 55% by weight of the asphalt based on the total weight of the asphalt shingle waste filled coating. In some embodiments, the asphalt shingle waste filled coating comprises 20% to 50% by weight of the asphalt based on the total weight of the asphalt shingle waste filled coating. In some embodiments, the asphalt shingle waste filled coating comprises 20% to 45% by weight of the asphalt based on the total weight of the asphalt shingle waste filled coating. In some embodiments, the asphalt shingle waste filled coating comprises 20% to 40% by weight of the asphalt based on the total weight of the asphalt shingle waste filled coating. In some embodiments, the asphalt shingle waste filled coating comprises 20% to 35% by weight of the asphalt based on the total weight of the asphalt shingle waste filled coating. In some embodiments, the asphalt shingle waste filled coating comprises 20% to 30% by weight of the asphalt based on the total weight of the asphalt shingle waste filled coating.

In some embodiments, the asphalt shingle waste filled coating comprises 25% to 70% by weight of the asphalt based on the total weight of the asphalt shingle waste filled coating. In some embodiments, the asphalt shingle waste filled coating comprises 30% to 70% by weight of the asphalt based on the total weight of the asphalt shingle waste filled coating. In some embodiments, the asphalt shingle waste filled coating comprises 35% to 70% by weight of the asphalt based on the total weight of the asphalt shingle waste filled coating. In some embodiments, the asphalt shingle waste filled coating comprises 40% to 70% by weight of the asphalt based on the total weight of the asphalt shingle waste filled coating. In some embodiments, the asphalt shingle waste filled coating comprises 45% to 70% by weight of the asphalt based on the total weight of the asphalt shingle waste filled coating. In some embodiments, the asphalt shingle waste filled coating comprises 50% to 70% by weight of the asphalt based on the total weight of the asphalt shingle waste filled coating. In some embodiments, the asphalt shingle waste filled coating comprises 55% to 70% by weight of the asphalt based on the total weight of the asphalt shingle waste filled coating.

In some embodiments, the asphalt shingle waste filled coating comprises 30% to 80% by weight of the asphalt based on the total weight of the asphalt shingle waste filled coating. In some embodiments, the asphalt shingle waste filled coating comprises 30% to 55% by weight of the asphalt based on the total weight of the asphalt shingle waste filled coating. In some embodiments, the asphalt shingle waste filled coating comprises 30% to 50% by weight of the asphalt based on the total weight of the asphalt shingle waste filled coating. In some embodiments, the asphalt shingle waste filled coating comprises 30% to 45% by weight of the asphalt based on the total weight of the asphalt shingle waste filled coating. In some embodiments, the asphalt shingle waste filled coating comprises 30% to 40% by weight of the asphalt based on the total weight of the asphalt shingle waste filled coating. In some embodiments, the asphalt shingle waste filled coating comprises 20% to 80% by weight of the asphalt based on the total weight of the asphalt shingle waste filled coating. In some embodiments, the asphalt shingle waste filled coating comprises 20% to 70% by weight of the asphalt based on the total weight of the asphalt shingle waste filled coating.

In some embodiments, the asphalt shingle waste filled coating comprises 35% to 55% by weight of the asphalt based on the total weight of the asphalt shingle waste filled coating. In some embodiments, the asphalt shingle waste filled coating comprises 35% to 50% by weight of the asphalt based on the total weight of the asphalt shingle waste filled coating. In some embodiments, the asphalt shingle waste filled coating comprises 35% to 45% by weight of the asphalt based on the total weight of the asphalt shingle waste filled coating. In some embodiments, the asphalt shingle waste filled coating comprises 35% to 40% by weight of the asphalt based on the total weight of the asphalt shingle waste filled coating.

In some embodiments, the asphalt shingle waste filled coating comprises 1% to 99% by weight of the virgin asphalt based on the total weight of the asphalt. In some embodiments, the asphalt shingle waste filled coating comprises 40% to 99% by weight of the virgin asphalt based on the total weight of the asphalt. In some embodiments, the asphalt shingle waste filled coating comprises 40% to 95% by weight of the virgin asphalt based on the total weight of the asphalt. In some embodiments, the asphalt shingle waste filled coating comprises 40% to 90% by weight of the virgin asphalt based on the total weight of the asphalt. In some embodiments, the asphalt shingle waste filled coating comprises 40% to 85% by weight of the virgin asphalt based on the total weight of the asphalt. In some embodiments, the asphalt shingle waste filled coating comprises 40% to 80% by weight of the virgin asphalt based on the total weight of the asphalt. In some embodiments, the asphalt shingle waste filled coating comprises 40% to 75% by weight of the virgin asphalt based on the total weight of the asphalt. In some embodiments, the asphalt shingle waste filled coating comprises 40% to 70% by weight of the virgin asphalt based on the total weight of the asphalt. In some embodiments, the asphalt shingle waste filled coating comprises 40% to 65% by weight of the virgin asphalt based on the total weight of the asphalt. In some embodiments, the asphalt shingle waste filled coating comprises 40% to 60% by weight of the virgin asphalt based on the total weight of the asphalt. In some embodiments, the asphalt shingle waste filled coating comprises 40% to 55% by weight of the virgin asphalt based on the total weight of the asphalt. In some embodiments, the asphalt shingle waste filled coating comprises 40% to 50% by weight of the virgin asphalt based on the total weight of the asphalt. In some embodiments, the asphalt shingle waste filled coating comprises 40% to 45% by weight of the virgin asphalt based on the total weight of the asphalt.

In some embodiments, the asphalt shingle waste filled coating comprises 45% to 99% by weight of the virgin asphalt based on the total weight of the asphalt. In some embodiments, the asphalt shingle waste filled coating comprises 50% to 99% by weight of the virgin asphalt based on the total weight of the asphalt. In some embodiments, the asphalt shingle waste filled coating comprises 55% to 99% by weight of the virgin asphalt based on the total weight of the asphalt. In some embodiments, the asphalt shingle waste filled coating comprises 60% to 99% by weight of the virgin asphalt based on the total weight of the asphalt. In some embodiments, the asphalt shingle waste filled coating comprises 65% to 99% by weight of the virgin asphalt based on the total weight of the asphalt. In some embodiments, the asphalt shingle waste filled coating comprises 70% to 99% by weight of the virgin asphalt based on the total weight of the asphalt. In some embodiments, the asphalt shingle waste filled coating comprises 75% to 99% by weight of the virgin asphalt based on the total weight of the asphalt. In some embodiments, the asphalt shingle waste filled coating comprises 80% to 99% by weight of the virgin asphalt based on the total weight of the asphalt. In some embodiments, the asphalt shingle waste filled coating comprises 85% to 99% by weight of the virgin asphalt based on the total weight of the asphalt. In some embodiments, the asphalt shingle waste filled coating comprises 90% to 99% by weight of the virgin asphalt based on the total weight of the asphalt. In some embodiments, the asphalt shingle waste filled coating comprises 95% to 99% by weight of the virgin asphalt based on the total weight of the asphalt.

In some embodiments, the asphalt shingle waste filled coating comprises 45% to 95% by weight of the virgin asphalt based on the total weight of the asphalt. In some embodiments, the asphalt shingle waste filled coating comprises 50% to 95% by weight of the virgin asphalt based on the total weight of the asphalt. In some embodiments, the asphalt shingle waste filled coating comprises 55% to 95% by weight of the virgin asphalt based on the total weight of the asphalt. In some embodiments, the asphalt shingle waste filled coating comprises 60% to 95% by weight of the virgin asphalt based on the total weight of the asphalt. In some embodiments, the asphalt shingle waste filled coating comprises 65% to 95% by weight of the virgin asphalt based on the total weight of the asphalt. In some embodiments, the asphalt shingle waste filled coating comprises 70% to 95% by weight of the virgin asphalt based on the total weight of the asphalt. In some embodiments, the asphalt shingle waste filled coating comprises 75% to 95% by weight of the virgin asphalt based on the total weight of the asphalt. In some embodiments, the asphalt shingle waste filled coating comprises 80% to 95% by weight of the virgin asphalt based on the total weight of the asphalt. In some embodiments, the asphalt shingle waste filled coating comprises 85% to 95% by weight of the virgin asphalt based on the total weight of the asphalt. In some embodiments, the asphalt shingle waste filled coating comprises 90% to 95% by weight of the virgin asphalt based on the total weight of the asphalt.

In some embodiments, the asphalt shingle waste filled coating comprises 1% to 99% by weight of the waste asphalt based on the total weight of the asphalt. In some embodiments, the asphalt shingle waste filled coating comprises 1% to 60% by weight of the waste asphalt based on the total weight of the asphalt. In some embodiments, the asphalt shingle waste filled coating comprises 1% to 55% by weight of the waste asphalt based on the total weight of the asphalt. In some embodiments, the asphalt shingle waste filled coating comprises 1% to 50% by weight of the waste asphalt based on the total weight of the asphalt. In some embodiments, the asphalt shingle waste filled coating comprises 1% to 45% by weight of the waste asphalt based on the total weight of the asphalt. In some embodiments, the asphalt shingle waste filled coating comprises 1% to 40% by weight of the waste asphalt based on the total weight of the asphalt. In some embodiments, the asphalt shingle waste filled coating comprises 1% to 35% by weight of the waste asphalt based on the total weight of the asphalt. In some embodiments, the asphalt shingle waste filled coating comprises 1% to 30% by weight of the waste asphalt based on the total weight of the asphalt. In some embodiments, the asphalt shingle waste filled coating comprises 1% to 25% by weight of the waste asphalt based on the total weight of the asphalt. In some embodiments, the asphalt shingle waste filled coating comprises 1% to 20% by weight of the waste asphalt based on the total weight of the asphalt. In some embodiments, the asphalt shingle waste filled coating comprises 1% to 15% by weight of the waste asphalt based on the total weight of the asphalt. In some embodiments, the asphalt shingle waste filled coating comprises 1% to 10% by weight of the waste asphalt based on the total weight of the asphalt. In some embodiments, the asphalt shingle waste filled coating comprises 1% to 5% by weight of the waste asphalt based on the total weight of the asphalt.

In some embodiments, the asphalt shingle waste filled coating comprises 5% to 60% by weight of the waste asphalt based on the total weight of the asphalt. In some embodiments, the asphalt shingle waste filled coating comprises 10% to 60% by weight of the waste asphalt based on the total weight of the asphalt. In some embodiments, the asphalt shingle waste filled coating comprises 15% to 60% by weight of the waste asphalt based on the total weight of the asphalt. In some embodiments, the asphalt shingle waste filled coating comprises 20% to 60% by weight of the waste asphalt based on the total weight of the asphalt. In some embodiments, the asphalt shingle waste filled coating comprises 25% to 60% by weight of the waste asphalt based on the total weight of the asphalt. In some embodiments, the asphalt shingle waste filled coating comprises 30% to 60% by weight of the waste asphalt based on the total weight of the asphalt. In some embodiments, the asphalt shingle waste filled coating comprises 35% to 60% by weight of the waste asphalt based on the total weight of the asphalt. In some embodiments, the asphalt shingle waste filled coating comprises 40% to 60% by weight of the waste asphalt based on the total weight of the asphalt. In some embodiments, the asphalt shingle waste filled coating comprises 45% to 60% by weight of the waste asphalt based on the total weight of the asphalt. In some embodiments, the asphalt shingle waste filled coating comprises 50% to 60% by weight of the waste asphalt based on the total weight of the asphalt. In some embodiments, the asphalt shingle waste filled coating comprises 55% to 60% by weight of the waste asphalt based on the total weight of the asphalt.

In some embodiments, the asphalt shingle waste filled coating comprises the phase modifier.

In some embodiments, the asphalt shingle waste filled coating comprises 0.1% to 25% by weight of the phase modifier based on the total weight of the asphalt shingle waste filled coating. In some embodiments, the phase modifier is present in an amount of 0.25 wt. % to 25 wt. % based on the total weight of the asphalt shingle waste filled coating. In some embodiments, the phase modifier is present in an amount of 0.5 wt. % to 25 wt. % based on the total weight of the asphalt shingle waste filled coating. In some embodiments, the phase modifier is present in an amount of 0.75 wt. % to 25 wt. % based on the total weight of the asphalt shingle waste filled coating. In some embodiments, the phase modifier is present in an amount of 1 wt. % to 25 wt. % based on the total weight of the asphalt shingle waste filled coating. In some embodiments, the phase modifier is present in an amount of 2 wt. % to 25 wt. % based on the total weight of the asphalt shingle waste filled coating. In some embodiments, the phase modifier is present in an amount of 3 wt. % to 25 wt. % based on the total weight of the asphalt shingle waste filled coating. In some embodiments, the phase modifier is present in an amount of 4 wt. % to 25 wt. % based on the total weight of the asphalt shingle waste filled coating. In some embodiments, the phase modifier is present in an amount of 5 wt. % to 25 wt. % based on the total weight of the asphalt shingle waste filled coating. In some embodiments, the phase modifier is present in an amount of 10 wt. % to 25 wt. % based on the total weight of the asphalt shingle waste filled coating. In some embodiments, the phase modifier is present in an amount of 15 wt. % to 25 wt. % based on the total weight of the asphalt shingle waste filled coating. In some embodiments, the phase modifier is present in an amount of 20 wt. % to 25 wt. % based on the total weight of the asphalt shingle waste filled coating.

In some embodiments, the phase modifier is present in an amount of 0.25 wt. % to 20 wt. % based on the total weight of the asphalt shingle waste filled coating. In some embodiments, the phase modifier is present in an amount of 0.25 wt. % to 15 wt. % based on the total weight of the asphalt shingle waste filled coating. In some embodiments, the phase modifier is present in an amount of 0.25 wt. % to 10 wt. % based on the total weight of the asphalt shingle waste filled coating. In some embodiments, the phase modifier is present in an amount of 0.25 wt. % to 5 wt. % based on the total weight of the asphalt shingle waste filled coating. In some embodiments, the phase modifier is present in an amount of 0.25 wt. % to 4 wt. % based on the total weight of the asphalt shingle waste filled coating. In some embodiments, the phase modifier is present in an amount of 0.25 wt. % to 3 wt. % based on the total weight of the asphalt shingle waste filled coating. In some embodiments, the phase modifier is present in an amount of 0.25 wt. % to 2 wt. % based on the total weight of the asphalt shingle waste filled coating. In some embodiments, the phase modifier is present in an amount of 0.25 wt. % to 1 wt. % based on the total weight of the asphalt shingle waste filled coating. In some embodiments, the phase modifier is present in an amount of 0.25 wt. % to 0.75 wt. % based on the total weight of the asphalt shingle waste filled coating. In some embodiments, the phase modifier is present in an amount of 0.25 wt. % to 0.5 wt. % based on the total weight of the asphalt shingle waste filled coating.

In some embodiments, the phase modifier is present in an amount of 0.1 wt. % to 10 wt. % based on the total weight of the asphalt shingle waste filled coating. In some embodiments, the phase modifier is present in an amount of 0.1 wt. % to 9 wt. % based on the total weight of the asphalt shingle waste filled coating. In some embodiments, the phase modifier is present in an amount of 0.1 wt. % to 8 wt. % based on the total weight of the asphalt shingle waste filled coating. In some embodiments, the phase modifier is present in an amount of 0.1 wt. % to 7 wt. % based on the total weight of the asphalt shingle waste filled coating. In some embodiments, the phase modifier is present in an amount of 0.1 wt. % to 6 wt. % based on the total weight of the asphalt shingle waste filled coating. In some embodiments, the phase modifier is present in an amount of 0.1 wt. % to 5 wt. % based on the total weight of the asphalt shingle waste filled coating. In some embodiments, the phase modifier is present in an amount of 0.1 wt. % to 4 wt. % based on the total weight of the asphalt shingle waste filled coating.

In some embodiments, the phase modifier is present in an amount of 0.1 wt. % to 3 wt. % based on the total weight of the asphalt shingle waste filled coating. In some embodiments, the phase modifier is present in an amount of 0.1 wt. % to 2.5 wt. % based on the total weight of the asphalt shingle waste filled coating. In some embodiments, the phase modifier is present in an amount of 0.1 wt. % to 2 wt. % based on the total weight of the asphalt shingle waste filled coating. In some embodiments, the phase modifier is present in an amount of 0.1 wt. % to 1.5 wt. % based on the total weight of the asphalt shingle waste filled coating. In some embodiments, the phase modifier is present in an amount of 0.1 wt. % to 1 wt. % based on the total weight of the asphalt shingle waste filled coating. In some embodiments, the phase modifier is present in an amount of 0.1 wt. % to 0.5 wt. % based on the total weight of the asphalt shingle waste filled coating. In some embodiments, the phase modifier is present in an amount of 1 wt. % to 3 wt. % based on the total weight of the asphalt shingle waste filled coating. In some embodiments, the phase modifier is present in an amount of 0.1 wt. % to 0.5 wt. % based on the total weight of the asphalt shingle waste filled coating.

In some embodiments, the asphalt shingle waste filled coating comprises at the least one filler.

In some embodiments, the asphalt shingle waste filled coating comprises 10% to 90% by weight of the at least one filler based on the total weight of the asphalt shingle waste filled coating. In some embodiments, the asphalt shingle waste filled coating comprises 10% to 85% by weight of the at least one filler based on the total weight of the asphalt shingle waste filled coating. In some embodiments, the asphalt shingle waste filled coating comprises 10% to 80% by weight of the at least one filler based on the total weight of the asphalt shingle waste filled coating. In some embodiments, the asphalt shingle waste filled coating comprises 10% to 75% by weight of the at least one filler based on the total weight of the asphalt shingle waste filled coating. In some embodiments, the asphalt shingle waste filled coating comprises 10% to 70% by weight of the at least one filler based on the total weight of the asphalt shingle waste filled coating. In some embodiments, the asphalt shingle waste filled coating comprises 10% to 65% by weight of the at least one filler based on the total weight of the asphalt shingle waste filled coating. In some embodiments, the asphalt shingle waste filled coating comprises 10% to 60% by weight of the at least one filler based on the total weight of the asphalt shingle waste filled coating. In some embodiments, the asphalt shingle waste filled coating comprises 10% to 55% by weight of the at least one filler based on the total weight of the asphalt shingle waste filled coating.

In some embodiments, the asphalt shingle waste filled coating comprises 10% to 50% by weight of the at least one filler based on the total weight of the asphalt shingle waste filled coating. In some embodiments, the asphalt shingle waste filled coating comprises 10% to 45% by weight of the at least one filler based on the total weight of the asphalt shingle waste filled coating. In some embodiments, the asphalt shingle waste filled coating comprises 10% to 40% by weight of the at least one filler based on the total weight of the asphalt shingle waste filled coating. In some embodiments, the asphalt shingle waste filled coating comprises 10% to 35% by weight of the at least one filler based on the total weight of the asphalt shingle waste filled coating. In some embodiments, the asphalt shingle waste filled coating comprises 10% to 30% by weight of the at least one filler based on the total weight of the asphalt shingle waste filled coating. In some embodiments, the asphalt shingle waste filled coating comprises 10% to 25% by weight of the at least one filler based on the total weight of the asphalt shingle waste filled coating. In some embodiments, the asphalt shingle waste filled coating comprises 10% to 20% by weight of the at least one filler based on the total weight of the asphalt shingle waste filled coating. In some embodiments, the asphalt shingle waste filled coating comprises 10% to 15% by weight of the at least one filler based on the total weight of the asphalt shingle waste filled coating.

In some embodiments, the asphalt shingle waste filled coating comprises 15% to 90% by weight of the at least one filler based on the total weight of the asphalt shingle waste filled coating. In some embodiments, the asphalt shingle waste filled coating comprises 20% to 90% by weight of the at least one filler based on the total weight of the asphalt shingle waste filled coating. In some embodiments, the asphalt shingle waste filled coating comprises 25% to 90% by weight of the at least one filler based on the total weight of the asphalt shingle waste filled coating. In some embodiments, the asphalt shingle waste filled coating comprises 30% to 90% by weight of the at least one filler based on the total weight of the asphalt shingle waste filled coating. In some embodiments, the asphalt shingle waste filled coating comprises 35% to 90% by weight of the at least one filler based on the total weight of the asphalt shingle waste filled coating. In some embodiments, the asphalt shingle waste filled coating comprises 40% to 90% by weight of the at least one filler based on the total weight of the asphalt shingle waste filled coating. In some embodiments, the asphalt shingle waste filled coating comprises 45% to 90% by weight of the at least one filler based on the total weight of the asphalt shingle waste filled coating. In some embodiments, the asphalt shingle waste filled coating comprises 50% to 90% by weight of the at least one filler based on the total weight of the asphalt shingle waste filled coating.

In some embodiments, the asphalt shingle waste filled coating comprises 55% to 90% by weight of the at least one filler based on the total weight of the asphalt shingle waste filled coating. In some embodiments, the asphalt shingle waste filled coating comprises 60% to 90% by weight of the at least one filler based on the total weight of the asphalt shingle waste filled coating. In some embodiments, the asphalt shingle waste filled coating comprises 65% to 90% by weight of the at least one filler based on the total weight of the asphalt shingle waste filled coating. In some embodiments, the asphalt shingle waste filled coating comprises 70% to 90% by weight of the at least one filler based on the total weight of the asphalt shingle waste filled coating. In some embodiments, the asphalt shingle waste filled coating comprises 75% to 90% by weight of the at least one filler based on the total weight of the asphalt shingle waste filled coating. In some embodiments, the asphalt shingle waste filled coating comprises 80% to 90% by weight of the at least one filler based on the total weight of the asphalt shingle waste filled coating. In some embodiments, the asphalt shingle waste filled coating comprises 85% to 90% by weight of the at least one filler based on the total weight of the asphalt shingle waste filled coating.

In some embodiments, the asphalt shingle waste filled coating comprises 40% to 80% by weight of the at least one filler based on the total weight of the asphalt shingle waste filled coating. In some embodiments, the asphalt shingle waste filled coating comprises 40% to 75% by weight of the at least one filler based on the total weight of the asphalt shingle waste filled coating. In some embodiments, the asphalt shingle waste filled coating comprises 40% to 70% by weight of the at least one filler based on the total weight of the asphalt shingle waste filled coating. In some embodiments, the asphalt shingle waste filled coating comprises 40% to 65% by weight of the at least one filler based on the total weight of the asphalt shingle waste filled coating. In some embodiments, the asphalt shingle waste filled coating comprises 40% to 60% by weight of the at least one filler based on the total weight of the asphalt shingle waste filled coating. In some embodiments, the asphalt shingle waste filled coating comprises 40% to 55% by weight of the at least one filler based on the total weight of the asphalt shingle waste filled coating. In some embodiments, the asphalt shingle waste filled coating comprises 40% to 50% by weight of the at least one filler based on the total weight of the asphalt shingle waste filled coating. In some embodiments, the asphalt shingle waste filled coating comprises 40% to 45% by weight of the at least one filler based on the total weight of the asphalt shingle waste filled coating.

In some embodiments, the asphalt shingle waste filled coating comprises 45% to 80% by weight of the at least one filler based on the total weight of the asphalt shingle waste filled coating. In some embodiments, the asphalt shingle waste filled coating comprises 50% to 80% by weight of the at least one filler based on the total weight of the asphalt shingle waste filled coating. In some embodiments, the asphalt shingle waste filled coating comprises 50% to 70% by weight of the at least one filler based on the total weight of the asphalt shingle waste filled coating. In some embodiments, the asphalt shingle waste filled coating comprises 55% to 80% by weight of the at least one filler based on the total weight of the asphalt shingle waste filled coating. In some embodiments, the asphalt shingle waste filled coating comprises 60% to 80% by weight of the at least one filler based on the total weight of the asphalt shingle waste filled coating. In some embodiments, the asphalt shingle waste filled coating comprises 65% to 80% by weight of the at least one filler based on the total weight of the asphalt shingle waste filled coating. In some embodiments, the asphalt shingle waste filled coating comprises 70% to 80% by weight of the at least one filler based on the total weight of the asphalt shingle waste filled coating. In some embodiments, the asphalt shingle waste filled coating comprises 75% to 80% by weight of the at least one filler based on the total weight of the asphalt shingle waste filled coating.

In some embodiments, the asphalt shingle waste filled coating comprises 50% to 70% by weight of the at least one filler based on the total weight of the asphalt shingle waste filled coating. In some embodiments, the asphalt shingle waste filled coating comprises 50% to 65% by weight of the at least one filler based on the total weight of the asphalt shingle waste filled coating. In some embodiments, the asphalt shingle waste filled coating comprises 50% to 60% by weight of the at least one filler based on the total weight of the asphalt shingle waste filled coating. In some embodiments, the asphalt shingle waste filled coating comprises 50% to 55% by weight of the at least one filler based on the total weight of the asphalt shingle waste filled coating. In some embodiments, the asphalt shingle waste filled coating comprises 55% to 70% by weight of the at least one filler based on the total weight of the asphalt shingle waste filled coating. In some embodiments, the asphalt shingle waste filled coating comprises 60% to 70% by weight of the at least one filler based on the total weight of the asphalt shingle waste filled coating. In some embodiments, the asphalt shingle waste filled coating comprises 65% to 70% by weight of the at least one filler based on the total weight of the asphalt shingle waste filled coating. In some embodiments, the asphalt shingle waste filled coating comprises 55% to 65% by weight of the at least one filler based on the total weight of the asphalt shingle waste filled coating.

In some embodiments, the asphalt shingle waste filled coating comprises the asphalt mixture, with a remainder of the asphalt shingle waste filled coating comprising the at least one filler, wherein the asphalt mixture comprises at least one of the virgin asphalt, the asphalt shingle waste (e.g., at least one of the waste asphalt, the limestone, the granules, the impurities, or any combination thereof), the phase modifier, or any combination thereof.

In some embodiments, the asphalt shingle waste filled coating comprises the asphalt and the phase modifier, with a remainder of the asphalt shingle waste filled coating comprising the at least one filler, wherein the asphalt comprises at least one of the virgin asphalt, the waste asphalt, or any combination thereof.

In some embodiments, the asphalt shingle waste filled coating does not comprise a paving grade asphalt.

In some embodiments, the asphalt shingle waste filled coating on a substrate.

In some embodiments, the substrate comprises at least one of a plywood substrate, a glass substrate, a cellulosic substrate, a roof shingle, a mat, a fabric, a polyester mat, a glass mat, a fiberglass mat, an underlayment, a roofing membrane, a roof deck, a photovoltaic (PV) panel, a modified bitumen (MODBIT) substrate, a roll good, a board (such as but not limited to at least one of a foam board (e.g., a polyisocyanurate (ISO) foam board), a cover board, or any combination thereof), a pipe, a base sheet, a chimney, a wax paper, or any combination thereof.

FIG. 1 shows a method 10, according to some embodiments. In some embodiments, the method 10 can result in a roofing shingle from a combination comprising a virgin asphalt, an asphalt shingle waste, and a phase modifier.

At block 15, the method 10 comprises obtaining a virgin asphalt. At block 20, the method 10 comprises obtaining an asphalt shingle waste. In some embodiments, the asphalt shingle waste comprises 5 wt. % to 40 wt. % of a waste asphalt based on a total weight of the asphalt shingle waste. In some embodiments, the asphalt shingle waste comprises 60 wt. % to 95 wt. % of limestone, granules, and/or impurities based on the total weight of the asphalt shingle waste.

At block 25, the method 10 comprises obtaining a phase modifier. At block 30, the method 10 comprises mixing the virgin asphalt, the asphalt shingle waste, and the phase modifier to form an asphalt mixture. In some embodiments, the mixing of the virgin asphalt, the asphalt shingle waste, and the phase modifier is performed in a particular order. For example, in some embodiments, the mixing comprises mixing the virgin asphalt and the asphalt shingle waste to form a first mixture, and mixing the phase modifier and the first mixture to form the asphalt mixture. In some embodiments, the mixing comprising mixing the virgin asphalt and the phase modifier to form a first mixture, and mixing the asphalt shingle waste and the first mixture to form the asphalt mixture. In some embodiments, the phase modifier is added to the asphalt shingle waste in an amount of 0.25 wt. % to 25 wt. % based on a total weight of the asphalt mixture.

In some embodiments, the method 10 further comprises obtaining at least one filler and mixing the at least one filler with the virgin asphalt, the asphalt shingle waste, and the phase modifier to form the asphalt mixture.

In some embodiments, the asphalt mixture from block 30 is configured to be applied to a substrate to obtain a roofing shingle. In some embodiments, the asphalt mixture from block 30 is configured to be applied to a substrate to obtain at least one of an asphalt coating, an asphalt filled coating, an asphalt shingle waste coating, an asphalt shingle waste filled coating, or any combination thereof, on the substrate. In some embodiments, the method further comprises applying granules to at least one of the asphalt mixture, an asphalt coating, an asphalt filled coating, an asphalt shingle waste coating, an asphalt shingle waste filled coating, or any combination thereof, to obtain the roofing shingle.

Optionally, in some embodiment, at block 35, the method 10 comprises forming a roofing shingle from the asphalt mixture.

In some embodiments, a roofing shingle formed from the method 10 comprises one or more of the properties in the following paragraphs.

In some embodiments, the roofing shingle has an average tear strength (g) of 1750 g to 2000 g when tested according to ASTM 3462. In some embodiments, the roofing shingle has an average tear strength (g) of 1800 g to 2000 g when tested according to ASTM 3462. In some embodiments, the roofing shingle has an average tear strength (g) of 1850 g to 2000 g when tested according to ASTM 3462 In some embodiments, the roofing shingle has an average tear strength (g) of 1900 g to 2000 g when tested according to ASTM 3462. In some embodiments, the roofing shingle has an average tear strength (g) of 1950 g to 2000 g when tested according to ASTM 3462.

In some embodiments, the roofing shingle has an average tear strength (g) of 1750 g to 1950 g when tested according to ASTM 3462. In some embodiments, the roofing shingle has an average tear strength (g) of 1750 g to 1900 g when tested according to ASTM 3462. In some embodiments, the roofing shingle has an average tear strength (g) of 1750 g to 1850 g when tested according to ASTM 3462. In some embodiments, the roofing shingle has an average tear strength (g) of 1750 g to 1800 g when tested according to ASTM 3462.

In some embodiments, the roofing shingle has an average fastener pull-through resistance at 73° F. (+/−4° F.) in (lbf) of 35 lbf to 55 lbf when tested according to ASTM 3462. In some embodiments, the roofing shingle has an average fastener pull-through resistance at 73° F. (+/−4° F.) in (lbf) of 40 lbf to 55 lbf when tested according to ASTM 3462. In some embodiments, the roofing shingle has an average fastener pull-through resistance at 73° F. (+/−4° F.) in (lbf) of 45 lbf to 55 lbf when tested according to ASTM 3462. In some embodiments, the roofing shingle has an average fastener pull-through resistance at 73° F. (+/−4° F.) in (lbf) of 50 lbf to 55 lbf when tested according to ASTM 3462.

In some embodiments, the roofing shingle has an average fastener pull-through resistance at 73° F. (+/−4° F.) in (lbf) of 35 lbf to 50 lbf when tested according to ASTM 3462. In some embodiments, the roofing shingle has an average fastener pull-through resistance at 73° F. (+/−4° F.) in (lbf) of 35 lbf to 45 lbf when tested according to ASTM 3462. In some embodiments, the roofing shingle has an average fastener pull-through resistance at 73° F. (+/−4° F.) in (lbf) of 35 lbf to 40 lbf when tested according to ASTM 3462.

In some embodiments, the roofing shingle has an average fastener pull-through resistance at 32° F. (+/−4° F.) in (lbf) of 45 lbf to 70 lbf when tested according to ASTM 3462. In some embodiments, the roofing shingle has an average fastener pull-through resistance at 32° F. (+/−4° F.) in (lbf) of 50 lbf to 70 lbf when tested according to ASTM 3462. In some embodiments, the roofing shingle has an average fastener pull-through resistance at 32° F. (+/−4° F.) in (lbf) of 55 lbf to 70 lbf when tested according to ASTM 3462. In some embodiments, the roofing shingle has an average fastener pull-through resistance at 32° F. (+/−4° F.) in (lbf) of 60 lbf to 70 lbf when tested according to ASTM 3462. In some embodiments, the roofing shingle has an average fastener pull-through resistance at 32° F. (+/−4° F.) in (lbf) of 65 lbf to 70 lbf when tested according to ASTM 3462.

In some embodiments, the roofing shingle has an average fastener pull-through resistance at 32° F. (+/−4° F.) in (lbf) of 45 lbf to 65 lbf when tested according to ASTM 3462. In some embodiments, the roofing shingle has an average fastener pull-through resistance at 32° F. (+/−4° F.) in (lbf) of 45 lbf to 60 lbf when tested according to ASTM 3462. In some embodiments, the roofing shingle has an average fastener pull-through resistance at 32° F. (+/−4° F.) in (lbf) of 45 lbf to 55 lbf when tested according to ASTM 3462. In some embodiments, the roofing shingle has an average fastener pull-through resistance at 32° F. (+/−4° F.) in (lbf) of 45 lbf to 50 lbf when tested according to ASTM 3462.

In some embodiments, the roofing shingle meets ASTM 3462 pliability at 73° F. (+/−4° F.).

In some embodiments, the roofing shingle has an average weight of displaced granules (g) of 0.25 g to 0.6 g when tested according to ASTM 3462. In some embodiments, the roofing shingle has an average weight of displaced granules (g) of 0.3 g to 0.6 g when tested according to ASTM 3462. In some embodiments, the roofing shingle has an average weight of displaced granules (g) of 0.35 g to 0.6 g when tested according to ASTM 3462. In some embodiments, the roofing shingle has an average weight of displaced granules (g) of 0.4 g to 0.6 g when tested according to ASTM 3462. In some embodiments, the roofing shingle has an average weight of displaced granules (g) of 0.45 g to 0.6 g when tested according to ASTM 3462. In some embodiments, the roofing shingle has an average weight of displaced granules (g) of 0.5 g to 0.6 g when tested according to ASTM 3462. In some embodiments, the roofing shingle has an average weight of displaced granules (g) of 0.55 g to 0.6 g when tested according to ASTM 3462.

In some embodiments, the roofing shingle has an average weight of displaced granules (g) of 0.25 g to 0.55 g when tested according to ASTM 3462. In some embodiments, the roofing shingle has an average weight of displaced granules (g) of 0.25 g to 0.5 g when tested according to ASTM 3462. In some embodiments, the roofing shingle has an average weight of displaced granules (g) of 0.25 g to 0.45 g when tested according to ASTM 3462. In some embodiments, the roofing shingle has an average weight of displaced granules (g) of 0.25 g to 0.4 g when tested according to ASTM 3462. In some embodiments, the roofing shingle has an average weight of displaced granules (g) of 0.25 g to 0.35 g when tested according to ASTM 3462. In some embodiments, the roofing shingle has an average weight of displaced granules (g) of 0.25 g to 0.3 g when tested according to ASTM 3462.

In some embodiments, the roofing shingle shows a behavior on heating: loss of volatile matter (%) of 0.1% to 0.5% when tested according to ASTM 3462. In some embodiments, the roofing shingle shows a behavior on heating: loss of volatile matter (%) of 0.2% to 0.5% when tested according to ASTM 3462. In some embodiments, the roofing shingle shows a behavior on heating: loss of volatile matter (%) of 0.3% to 0.5% when tested according to ASTM 3462. In some embodiments, the roofing shingle shows a behavior on heating: loss of volatile matter (%) of 0.4% to 0.5% when tested according to ASTM 3462.

In some embodiments, the roofing shingle shows a behavior on heating: loss of volatile matter (%) of 0.1% to 0.4% when tested according to ASTM 3462. In some embodiments, the roofing shingle shows a behavior on heating: loss of volatile matter (%) of 0.1% to 0.3% when tested according to ASTM 3462. In some embodiments, the roofing shingle shows a behavior on heating: loss of volatile matter (%) of 0.1% to 0.2% when tested according to ASTM 3462.

In some embodiments, the roofing shingle shows a behavior on heating: sliding of granular surfacing (in) of 0 in to 1/32 in when tested according to ASTM 3462.

In some embodiments, the roofing shingle has a minimum net mass per area (lbs./100 ft$^2$) of 95 lbs./100 ft$^2$ to 110 lbs./100 ft$^2$ when tested according to ASTM 3462. In some embodiments, the roofing shingle has a minimum net mass per area (lbs./100 ft$^2$) of 100 lbs./100 ft$^2$ to 110 lbs./100 ft$^2$ when tested according to ASTM 3462. In some embodiments, the roofing shingle has a minimum net mass per area (lbs./100 ft$^2$) of 105 lbs./100 ft$^2$ to 110 lbs./100 ft$^2$ when tested according to ASTM 3462.

In some embodiments, the roofing shingle has a minimum net mass per area (lbs./100 ft$^2$) of 95 lbs./100 ft$^2$ to 105 lbs./100 ft$^2$ when tested according to ASTM 3462. In some embodiments, the roofing shingle has a minimum net mass per area (lbs./100 ft$^2$) of 95 lbs./100 ft$^2$ to 100 lbs./100 ft$^2$ when tested according to ASTM 3462.

In some embodiments, the roofing shingle has an average net mass per area (lbs./100 ft$^2$) of 95 lbs./100 ft$^2$ to 115 lbs./100 ft$^2$ when tested according to ASTM 3462. In some embodiments, the roofing shingle has an average net mass per area (lbs./100 ft$^2$) of 100 lbs./100 ft$^2$ to 115 lbs./100 ft$^2$ when tested according to ASTM 3462. In some embodiments, the roofing shingle has an average net mass per area (lbs./100 ft$^2$) of 105 lbs./100 ft$^2$ to 115 lbs./100 ft$^2$ when tested according to ASTM 3462. In some embodiments, the roofing shingle has an average net mass per area (lbs./100 ft$^2$) of 110 lbs./100 ft$^2$ to 115 lbs./100 ft$^2$ when tested according to ASTM 3462.

In some embodiments, the roofing shingle has an average net mass per area (lbs./100 ft$^2$) of 95 lbs./100 ft$^2$ to 110 lbs./100 ft$^2$ when tested according to ASTM 3462. In some embodiments, the roofing shingle has an average net mass per area (lbs./100 ft$^2$) of 95 lbs/100 ft$^2$ to 105 lbs./100 ft$^2$ when tested according to ASTM 3462. In some embodiments, the roofing shingle has an average net mass per area (lbs./100 ft$^2$) of 95 lbs./100 ft$^2$ to 100 lbs./100 ft$^2$ when tested according to ASTM 3462.

In some embodiments, the roofing shingle has a mass per area of mat (lbs./100 ft$^2$) of 2.5 lbs./100 ft$^2$ to 3 lbs./100 ft$^2$ when tested according to ASTM 3462. In some embodiments, the roofing shingle has a mass per area of mat (lbs./100 ft$^2$) of 2.6 lbs./100 ft$^2$ to 3 lbs./100 ft$^2$ when tested according to ASTM 3462. In some embodiments, the roofing shingle has a mass per area of mat (lbs./100 ft$^2$) of 2.7 lbs./100 ft$^2$ to 3 lbs./100 ft$^2$ when tested according to ASTM 3462. In some embodiments, the roofing shingle has a mass per area of mat (lbs./100 ft$^2$) of 2.8 lbs./100 ft$^2$ to 3 lbs./100 ft$^2$ when tested according to ASTM 3462. In some embodiments, the roofing shingle has a mass per area of mat (lbs./100 ft$^2$) of 2.9 lbs./100 ft$^2$ to 3 lbs./100 ft$^2$ when tested according to ASTM 3462.

In some embodiments, the roofing shingle has a mass per area of mat (lbs./100 ft$^2$) of 2.5 lbs./100 ft$^2$ to 2.9 lbs./100 ft$^2$ when tested according to ASTM 3462. In some embodiments, the roofing shingle has a mass per area of mat (lbs./100 ft$^2$) of 2.5 lbs./100 ft$^2$ to 2.8 lbs./100 ft$^2$ when tested according to ASTM 3462. In some embodiments, the roofing shingle has a mass per area of mat (lbs./100 ft$^2$) of 2.5 lbs./100 ft$^2$ to 2.7 lbs./100 ft$^2$ when tested according to ASTM 3462. In some embodiments, the roofing shingle has a mass per area of mat (lbs./100 ft$^2$) of 2.5 lbs./100 ft$^2$ to 2.6 lbs./100 ft$^2$ when tested according to ASTM 3462.

In some embodiments, the roofing shingle has a mass per area of asphalt (lbs./100 ft$^2$) of 20 lbs./100 ft$^2$ to 25 lbs./100 ft$^2$ when tested according to ASTM 3462. In some embodiments, the roofing shingle has a mass per area of asphalt (lbs./100 ft$^2$) of 21 lbs./100 ft$^2$ to 25 lbs./100 ft$^2$ when tested according to ASTM 3462. In some embodiments, the roofing shingle has a mass per area of asphalt (lbs./100 ft$^2$) of 22 lbs./100 ft$^2$ to 25 lbs./100 ft$^2$ when tested according to ASTM 3462. In some embodiments, the roofing shingle has a mass per area of asphalt (lbs./100 ft$^2$) of 23 lbs./100 ft$^2$ to 25 lbs./100 ft$^2$ when tested according to ASTM 3462. In some embodiments, the roofing shingle has a mass per area of asphalt (lbs./100 ft$^2$) of 24 lbs./100 ft$^2$ to 25 lbs./100 ft$^2$ when tested according to ASTM 3462.

In some embodiments, the roofing shingle has a mass per area of asphalt (lbs./100 ft$^2$) of 20 lbs./100 ft$^2$ to 24 lbs./100 ft$^2$ when tested according to ASTM 3462. In some embodiments, the roofing shingle has a mass per area of asphalt (lbs./100 ft$^2$) of 20 lbs./100 ft$^2$ to 23 lbs./100 ft$^2$ when tested according to ASTM 3462. In some embodiments, the roofing shingle has a mass per area of asphalt (lbs./100 ft$^2$) of 20 lbs./100 ft$^2$ to 22 lbs./100 ft$^2$ when tested according to ASTM 3462. In some embodiments, the roofing shingle has a mass per area of asphalt (lbs./100 ft$^2$) of 20 lbs./100 ft$^2$ to 21 lbs./100 ft$^2$ when tested according to ASTM 3462.

In some embodiments, the roofing shingle has a mass per area of mineral passing a No. 6 sieve and retained on a No. 70 sieve (lbs./100 ft$^2$) of 48 lbs./100 ft$^2$ to 60 lbs./100 ft$^2$ when tested according to ASTM 3462. In some embodiments, the roofing shingle has a mass per area of mineral passing a No. 6 sieve and retained on a No. 70 sieve (lbs./100 ft$^2$) of 50 lbs./100 ft$^2$ to 60 lbs./100 ft$^2$ when tested according to ASTM 3462. In some embodiments, the roofing shingle has a mass per area of mineral passing a No. 6 sieve and retained on a No. 70 sieve (lbs./100 ft$^2$) of 52 lbs./100 ft$^2$ to 60 lbs./100 ft$^2$ when tested according to ASTM 3462. In some embodiments, the roofing shingle has a mass per area of mineral passing a No. 6 sieve and retained on a No. 70 sieve (lbs./100 ft$^2$) of 54 lbs./100 ft$^2$ to 60 lbs./100 ft$^2$ when tested according to ASTM 3462. In some embodiments, the roofing shingle has a mass per area of mineral passing a No. 6 sieve and retained on a No. 70 sieve (lbs./100 ft$^2$) of 56 lbs./100 ft$^2$ to 60 lbs./100 ft$^2$ when tested according to ASTM 3462. In some embodiments, the roofing shingle has a mass per area of mineral passing a No. 6 sieve and retained on a No. 70 sieve (lbs./100 ft$^2$) of 58 lbs./100 ft$^2$ to 60 lbs./100 ft$^2$ when tested according to ASTM 3462.

In some embodiments, the roofing shingle has a mass per area of mineral passing a No. 6 sieve and retained on a No. 70 sieve (lbs./100 ft$^2$) of 48 lbs./100 ft$^2$ to 58 lbs./100 ft$^2$ when tested according to ASTM 3462. In some embodiments, the roofing shingle has a mass per area of mineral passing a No. 6 sieve and retained on a No. 70 sieve (lbs./100 ft$^2$) of 48 lbs./100 ft$^2$ to 56 lbs./100 ft$^2$ when tested according to ASTM 3462. In some embodiments, the roofing shingle has a mass per area of mineral passing a No. 6 sieve and retained on a No. 70 sieve (lbs./100 ft$^2$) of 48 lbs./100 ft$^2$ to 54 lbs./100 ft$^2$ when tested according to ASTM 3462. In some embodiments, the roofing shingle has a mass per area of mineral passing a No. 6 sieve and retained on a No. 70 sieve (lbs./100 ft$^2$) of 48 lbs./100 ft$^2$ to 52 lbs./100 ft$^2$ when tested according to ASTM 3462. In some embodiments, the roofing shingle has a mass per area of mineral passing a No. 6 sieve and retained on a No. 70 sieve (lbs./100 ft$^2$) of 48 lbs./100 ft$^2$ to 50 lbs./100 ft$^2$ when tested according to ASTM 3462.

In some embodiments, the roofing shingle has fine mineral matter (lbs./100 ft$^2$) of 25 lbs./100 ft$^2$ to 35 lbs./100 ft$^2$ when tested according to ASTM 3462. In some embodiments, the roofing shingle has fine mineral matter (lbs./100 ft$^2$) of 30 lbs./100 ft$^2$ to 35 lbs./100 ft$^2$ when tested according to ASTM 3462.

In some embodiments, the roofing shingle has fine mineral matter (lbs./100 ft$^2$) of 25 lbs./100 ft$^2$ to 30 lbs./100 ft$^2$ when tested according to ASTM 3462.

In some embodiments, the roofing shingle has a mass percent of mineral matter passing No. 70 sieve (%) of 55% to 65% when tested according to ASTM 3462. In some embodiments, the roofing shingle has a mass percent of mineral matter passing No. 70 sieve (%) of 60% to 65% when tested according to ASTM 3462.

In some embodiments, the roofing shingle has a mass percent of mineral matter passing No. 70 sieve (%) of 55% to 60% when tested according to ASTM 3462.

In some embodiments, the roofing shingle has an asphalt softening point (° F.) of 200° F. to 210° F. when tested according to ASTM 3462. In some embodiments, the roofing shingle has an asphalt softening point (° F.) of 205° F. to 210° F. when tested according to ASTM 3462.

In some embodiments, the roofing shingle has an asphalt softening point (° F.) of 200° F. to 205° F. when tested according to ASTM 3462.

In some embodiments, the roofing shingle has a penetration point (dmm) at 77° F. of 16 dmm to 20 dmm when tested according to ASTM 3462. In some embodiments, the roofing shingle has a penetration point (dmm) at 77° F. of 17 dmm to 20 dmm when tested according to ASTM 3462. In some embodiments, the roofing shingle has a penetration point (dmm) at 77° F. of 18 dmm to 20 dmm when tested according to ASTM 3462. In some embodiments, the roofing shingle has a penetration point (dmm) at 77° F. of 19 dmm to 20 dmm when tested according to ASTM 3462.

In some embodiments, the roofing shingle has a penetration point (dmm) at 77° F. of 16 dmm to 19 dmm when tested according to ASTM 3462. In some embodiments, the roofing shingle has a penetration point (dmm) at 77° F. of 16 dmm to 18 dmm when tested according to ASTM 3462. In some embodiments, the roofing shingle has a penetration point (dmm) at 77° F. of 16 dmm to 17 dmm when tested according to ASTM 3462.

Figure 2:
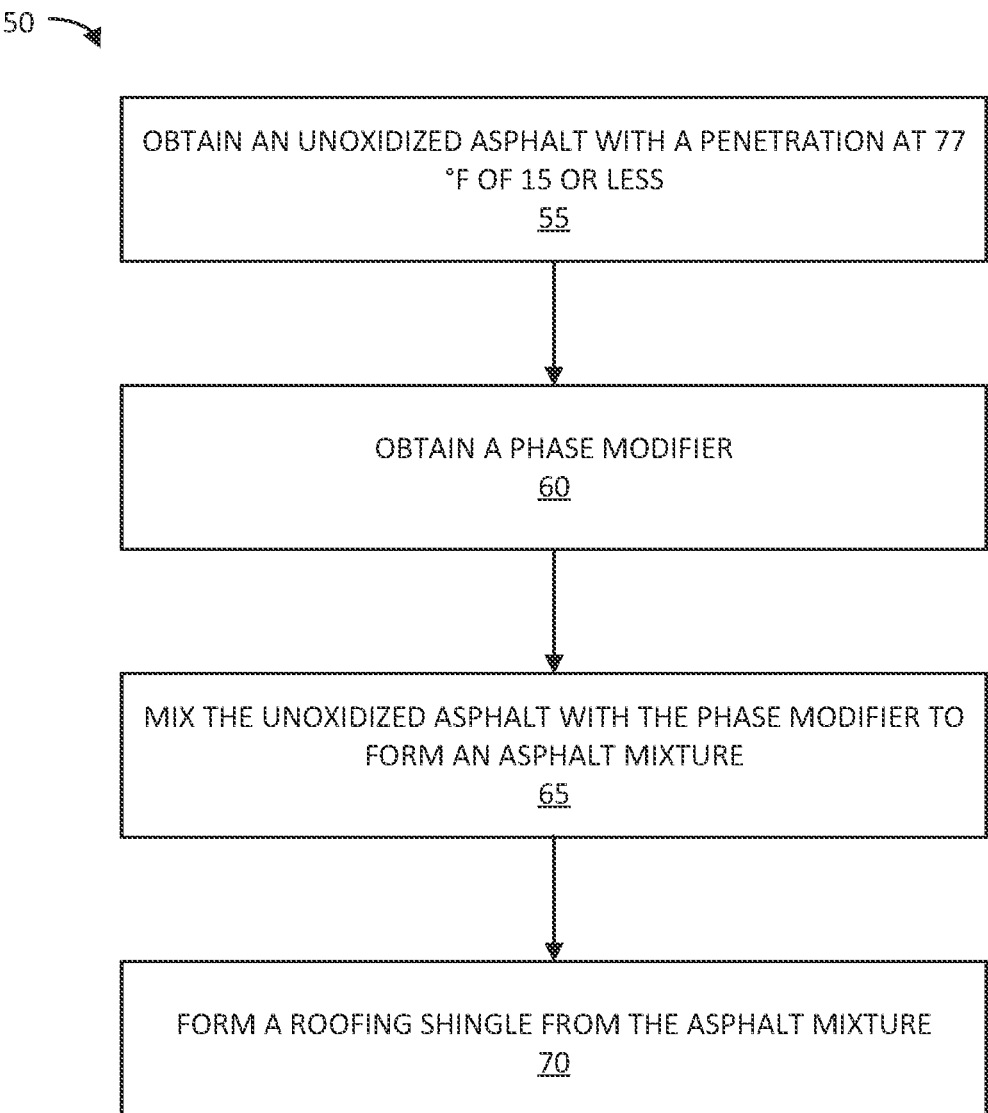
FIG. 2 shows a method, according to some embodiments.

FIG. 2 shows a method 50, according to some embodiments.

At block 55, the method 50 comprises obtaining an unoxidized asphalt that has a penetration point at 77° F. of 15 dmm or less when tested according to ASTM D5.

At block 60, the method 50 comprises obtaining a phase modifier.

At block 65, the method 50 comprises mixing the unoxidized asphalt with the phase modifier to form an asphalt mixture. In some embodiments, the phase modifier is added to the unoxidized asphalt in an amount of 0.25 wt. % to 25 wt. % based on the total weight of the asphalt mixture.

In some embodiments, the asphalt mixture of block 65 is configured to be applied to a roof substrate to obtain a roofing shingle.

In some embodiments, optionally, at block 70, the method 50 comprises forming a roofing shingle from the asphalt mixture. In some embodiments, a roofing shingle formed from the method 50 comprises the properties disclosed herein.

Figure 3:
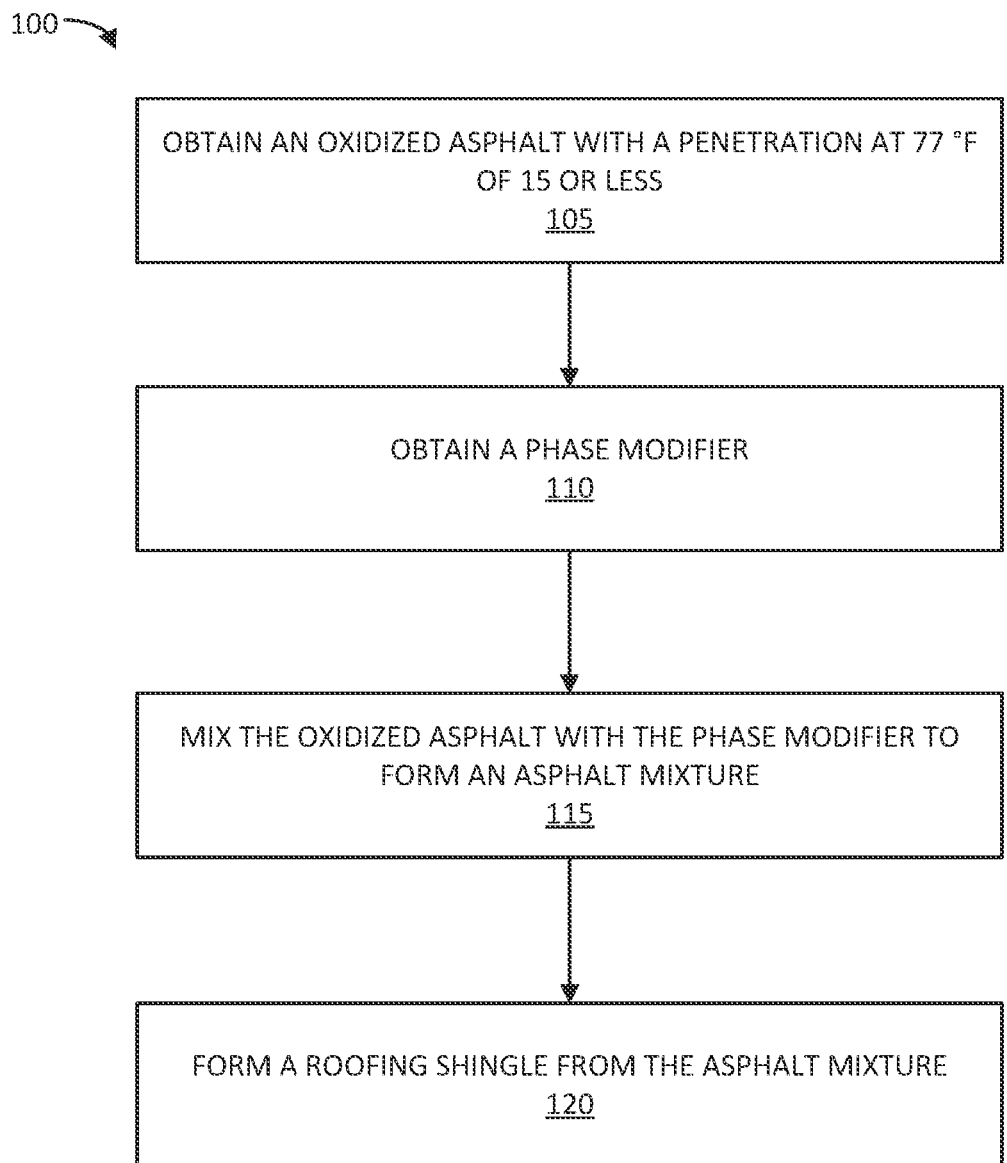
FIG. 3 shows a method, according to some embodiments.

FIG. 3 shows a method 100, according to some embodiments.

At block 105, the method 100 comprises obtaining an oxidized asphalt that has a penetration point at 77° F. of 15 dmm or less when tested according to ASTM D5.

At block 110, the method 100 comprises obtaining a phase modifier.

At block 115, the method 100 comprises mixing the oxidized asphalt with a phase modifier to form an asphalt mixture. In some embodiments, the phase modifier is added to the oxidized asphalt in an amount of 0.25 wt. % to 25 wt. % based on the total weight of the asphalt mixture.

In some embodiments, the phase modifier is added in a sufficient amount so as to increase the penetration of the asphalt at 77° F. by 15% to 30% when tested according to ASTM 3462. In some embodiments, the phase modifier is added in a sufficient amount so as to increase the penetration of the asphalt at 77° F. by 20% to 30% when tested according to ASTM 3462. In some embodiments, the phase modifier is added in a sufficient amount so as to increase the penetration of the asphalt at 77° F. by 25% to 30% when tested according to ASTM 3462. In some embodiments, the phase modifier is added in a sufficient amount so as to increase the penetration of the asphalt at 77° F. by 15% to 25% when tested according to ASTM 3462. In some embodiments, the phase modifier is added in a sufficient amount so as to increase the penetration of the asphalt at 77° F. by 15% to 20% when tested according to ASTM 3462.

In some embodiments, the asphalt mixture at block 115 is configured to be applied to a roof substrate to obtain a roofing shingle.

In some embodiments, optionally, at block 120, the method 100 comprises forming a roofing shingle from the asphalt mixture. In some embodiments, a roofing shingle formed from the method 100 comprises the properties disclosed herein.

Example 1

Various asphalt mixtures were prepared and compared to an asphalt control.

The asphalt control was an oxidized asphalt. The asphalt control is represented in Table 4 below as Sample 1.

The asphalt mixture comprised an oxidized asphalt and a waste asphalt. The waste asphalt was obtained from asphalt briquettes, which are formed from asphalt shingle waste powder. To prepare the asphalt mixture, the oxidized asphalt and the asphalt briquettes were mixed under heating. The resulting asphalt mixture comprised 90% by weight of the oxidized asphalt based on the total weight of the asphalt mixture, and 10% by weight of the waste asphalt based on the total weight of the asphalt mixture. This asphalt mixture is represented in Table 4 below as Sample 2.

Another asphalt mixture comprised an oxidized asphalt, a waste asphalt, and a phase modifier. The waste asphalt was obtained from asphalt briquettes, which are formed from asphalt shingle waste powder. To prepare the asphalt mixture, the oxidized asphalt and the asphalt briquettes were mixed under heating. After mixing the oxidized asphalt and the asphalt briquettes, a phase modifier was added. The resulting asphalt mixture comprised about 90% by weight of the oxidized asphalt based on the total weight of the asphalt mixture, about 10% by weight of the waste asphalt based on the total weight of the asphalt mixture, and 0.25% by weight of the phase modifier based on the total weight of the asphalt mixture. This asphalt mixture is represented in Table 4 below as Sample 3.

Various properties of each of the Sample 1, Sample 2, and Sample 3 were measured and are summarized in Table 4. The measured properties comprised the softening point as measured according to ASTM D3461, the viscosity (centipoise or cP) as measured according to ASTM D4402 at 400° F., the penetration point (dmm) at 77° F. as measured according to ASTM D5, and the durability (pass/fail).

TABLE 4

| Sample | Softening Point (° F.) | Viscosity (cP) (400° F.) | Penetration Point (dmm) (77° F.) | Durability (Pass/Fail) |
|---|---|---|---|---|
| Sample 1 | 205 | 333 | 19 | Pass |
| Sample 2 | 208 | 370 | 16 | Pass |
| Sample 3 | 205 | 349 | 18 | Pass |

As shown in Table 4, the addition of the phase modifier in Sample 3 lowered the softening point and the viscosity relative to Sample 2. The addition of the phase modifier in Sample 3 raised the penetration point relative to Sample 2. In addition, Sample 3 passed the durability test. Sample 3 illustrates that a phase modifier can be added to an oxidized asphalt and a waste asphalt to produce an asphalt mixture that meets all the physical testing properties and long-term aging properties necessary for roofing shingle applications.

Example 2

Various asphalt mixtures were prepared and compared to various asphalt controls.

The asphalt control was an oxidized asphalt. The asphalt control is represented in Table 5 below as Sample 4.

The asphalt mixture comprised an oxidized asphalt, a waste asphalt, and a phase modifier. The asphalt mixture was prepared by mixing the oxidized asphalt and the phase modifier. After mixing the oxidized asphalt and the phase modifier, asphalt briquettes were added and mixed under heating. The asphalt briquettes comprised waste asphalt and were prepared from asphalt shingle waste powder. The resulting asphalt mixture comprised about 90% by weight of the oxidized asphalt based on the total weight of the asphalt mixture, about 10% by weight of the waste asphalt based on the total weight of the asphalt mixture, and 0.25% by weight of the phase modifier based on the total weight of the asphalt mixture. This asphalt mixture is represented in Table 5 below as Sample 5.

Another asphalt control was an oxidized asphalt. The asphalt control is represented in Table 5 below as Sample 6.

Another asphalt mixture comprised an oxidized asphalt, a waste asphalt, and a phase modifier. The asphalt mixture was prepared by mixing the oxidized asphalt and the phase modifier. After mixing the oxidized asphalt and the phase modifier, asphalt briquettes were added and mixed under heating. The asphalt briquettes comprised waste asphalt and were prepared from asphalt shingle waste powder. The resulting asphalt mixture comprised about 90% by weight of the oxidized asphalt based on the total weight of the asphalt mixture, about 10% by weight of the waste asphalt based on the total weight of the asphalt mixture, and 0.25% by weight of the phase modifier based on the total weight of the asphalt mixture. This asphalt mixture is represented in Table 5 below as Sample 7.

Various properties of each of the Sample 4, Sample 5, Sample 6, and Sample 7 were measured and are summarized in Table 5. The measured properties comprised the softening point as measured according to ASTM D3461, the viscosity (centipoise or cP) as measured according to ASTM D4402 at 400° F., the penetration point (dmm) at 77° F. as measured according to ASTM D5, and the durability (pass/fail).

TABLE 5

| Sample | Softening Point (° F.) | Viscosity (cP) (400° F.) | Penetration Point (dmm) (77° F.) | Durability (Pass/Fail) |
|---|---|---|---|---|
| Sample 4 | 209 | 375 | 19 | Pass |
| Sample 5 | 211 | 439 | 16 | Pass |
| Sample 6 | 207 | 339 | 19 | Pass |
| Sample 7 | 211 | 428 | 16 | Pass |

Sample 5 and Sample 7 both illustrate that a phase modifier can be added to an oxidized asphalt and a waste asphalt to produce an asphalt mixture that meets all the physical testing properties and long-term aging properties necessary for roofing shingle applications.

Example 3

An asphalt mixture comprised an oxidized asphalt, a waste asphalt, and a phase modifier. The asphalt mixture was prepared by mixing the oxidized asphalt and the phase modifier. After mixing the oxidized asphalt and the phase modifier, asphalt briquettes were added and mixed under heating. The asphalt briquettes comprised waste asphalt and were prepared from asphalt shingle waste powder. The resulting asphalt mixture comprised about 80% by weight of the oxidized asphalt based on the total weight of the asphalt mixture, about 20% by weight of the waste asphalt based on the total weight of the asphalt mixture, and 1% by weight of the phase modifier based on the total weight of the asphalt mixture. This asphalt mixture is represented in Table 6 below as Sample 8.

An asphalt mixture comprised an oxidized asphalt, a waste asphalt, and a phase modifier. The asphalt mixture was prepared by mixing the oxidized asphalt and the phase modifier. After mixing the oxidized asphalt and the phase modifier, asphalt briquettes were added and mixed under heating. The asphalt briquettes comprised waste asphalt and were prepared from asphalt shingle waste powder. The resulting asphalt mixture comprised about 80% by weight of the oxidized asphalt based on the total weight of the asphalt mixture, about 20% by weight of the waste asphalt based on the total weight of the asphalt mixture, and 2% by weight of the phase modifier based on the total weight of the asphalt mixture. This asphalt mixture is represented in Table 6 below as Sample 9.

TABLE 6

| Sample | Softening Point (° F.) | Viscosity (cP) (400° F.) | Penetration Point (dmm) (77° F.) | Durability (Pass/Fail) |
|---|---|---|---|---|
| Sample 8 | 224 | 792 | 15 | Pass |
| Sample 9 | 219 | 648 | 19 | Pass |

Example 4

Various asphalt mixtures were prepared and compared to various asphalt controls.

The asphalt control was an oxidized asphalt. The asphalt control is represented in Table 7 below as Sample 10.

The asphalt mixture comprised an oxidized asphalt, a waste asphalt, and a phase modifier. The asphalt mixture was prepared by mixing the oxidized asphalt and the phase modifier. After mixing the oxidized asphalt and the phase modifier, asphalt briquettes were added and mixed under heating. The asphalt briquettes comprised waste asphalt and were prepared from asphalt shingle waste powder. The resulting asphalt mixture comprised about 90% by weight of the oxidized asphalt based on the total weight of the asphalt mixture, about 10% by weight of the waste asphalt based on the total weight of the asphalt mixture, and 0.25% by weight of the phase modifier based on the total weight of the asphalt mixture. This asphalt mixture is represented in Table 7 below as Sample 11.

TABLE 7

| Sample | Softening Point (° F.) | Viscosity (cP) (400° F.) | Penetration Point (dmm) (77° F.) | Durability (Pass/Fail) |
|---|---|---|---|---|
| Sample 10 | 206 | 338 | 19 | Pass |
| Sample 11 | 217 | 518 | 15 | Pass |

Example 5

Various asphalt mixtures were prepared and compared to an asphalt control.

The asphalt mixture comprised an oxidized asphalt and a waste asphalt. The waste asphalt was obtained from asphalt briquettes, which are formed from asphalt shingle waste powder. To prepare the asphalt mixture, the oxidized asphalt and the asphalt briquettes were mixed under heating. The resulting asphalt mixture comprised 90% by weight of the oxidized asphalt based on the total weight of the asphalt mixture, and 10% by weight of the waste asphalt based on the total weight of the asphalt mixture. This asphalt mixture is represented in Table 8 below as Sample 12.

Each of the additional asphalt mixtures comprised an oxidized asphalt, a waste asphalt, and a phase modifier. The waste asphalt was obtained from asphalt briquettes, which are formed from asphalt shingle waste powder. To prepare the asphalt mixture, the oxidized asphalt and the asphalt briquettes were mixed under heating. After mixing the oxidized asphalt and the asphalt briquettes, a phase modifier was added. The resulting asphalt mixture comprised about 90% by weight of the oxidized asphalt based on the total weight of the asphalt mixture, about 10% by weight of the waste asphalt based on the total weight of the asphalt mixture, and 1% by weight of the phase modifier based on the total weight of the asphalt mixture. Each of the additional asphalt mixtures are represented in Table 8 below as Samples 13-17.

Various properties of each of the Samples 12-17 were measured and are summarized in Table 8. The measured properties comprised the softening point as measured according to ASTM D3461, the viscosity (centipoise or cP) as measured according to ASTM D4402 at 400° F., and the penetration point (dmm) at 77° F. as measured according to ASTM D5.

TABLE 8

| Sample | Softening Point (° F.) | Viscosity (cP) (400° F.) | Penetration Point (dmm) (77° F.) |
|---|---|---|---|
| Sample 12 | 220 | 523 | 15 |
| Sample 13 | 216 | 510 | 17 |

TABLE 8-continued

| Sample | Softening Point (° F.) | Viscosity (cP) (400° F.) | Penetration Point (dmm) (77° F.) |
|---|---|---|---|
| Sample 14 | 214 | 524 | 17 |
| Sample 15 | 215 | 443 | 17 |
| Sample 16 | 215 | 480 | 18 |
| Sample 17 | 216 | 465 | 17 |

Example 6

Various asphalt mixtures were prepared and compared to an asphalt control.

The asphalt control was an oxidized asphalt. The asphalt control is represented in Table 9 below as Sample 18.

The asphalt mixture comprised an oxidized asphalt and a waste asphalt. The waste asphalt was obtained from asphalt briquettes, which are formed from asphalt shingle waste powder. To prepare the asphalt mixture, the oxidized asphalt and the asphalt briquettes were mixed under heating. The resulting asphalt mixture comprised 85% by weight of the oxidized asphalt based on the total weight of the asphalt mixture, and 15% by weight of the waste asphalt based on the total weight of the asphalt mixture. This asphalt mixture is represented in Table 9 below as Sample 19.

Another asphalt mixture comprised an oxidized asphalt, a waste asphalt, and a phase modifier. The waste asphalt was obtained from asphalt briquettes, which are formed from asphalt shingle waste powder. To prepare the asphalt mixture, the oxidized asphalt and the asphalt briquettes were mixed under heating. After mixing the oxidized asphalt and the asphalt briquettes, a phase modifier was added. The resulting asphalt mixture comprised about 85% by weight of the oxidized asphalt based on the total weight of the asphalt mixture, about 15% by weight of the waste asphalt based on the total weight of the asphalt mixture, and 1% by weight of the phase modifier based on the total weight of the asphalt mixture. This asphalt mixture is represented in Table 9 below as Sample 20.

Another asphalt mixture comprised an oxidized asphalt, a waste asphalt, and a phase modifier. The waste asphalt was obtained from asphalt briquettes, which are formed from asphalt shingle waste powder. To prepare the asphalt mixture, the oxidized asphalt and the asphalt briquettes were mixed under heating. After mixing the oxidized asphalt and the asphalt briquettes, a phase modifier was added. The resulting asphalt mixture comprised about 85% by weight of the oxidized asphalt based on the total weight of the asphalt mixture, about 15% by weight of the waste asphalt based on the total weight of the asphalt mixture, and 2% by weight of the phase modifier based on the total weight of the asphalt mixture. This asphalt mixture is represented in Table 9 below as Sample 21.

Various properties of each of the Samples 18-21 were measured and are summarized in Table 9. The measured properties comprised the softening point as measured according to ASTM D3461, the viscosity (centipoise or cP) as measured according to ASTM D4402 at 400° F., and the penetration point (dmm) at 77° F. as measured according to ASTM D5.

TABLE 9

| Sample | Softening Point (° F.) | Viscosity (cP) (400° F.) | Penetration Point (dmm) (77° F.) |
|---|---|---|---|
| Sample 18 | 207 | 339 | 19 |
| Sample 19 | 225 | 708 | 14 |
| Sample 20 | 220 | 616 | 17 |
| Sample 21 | 217 | 494 | 19 |

The terminology used herein is intended to describe embodiments and is not intended to be limiting. The terms "a," "an," and "the" comprise the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

It is to be understood that changes may be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

What is claimed is:

1. A roofing shingle comprising:
a substrate,
    wherein the substrate comprises a fiberglass mat; and
an asphalt shingle waste filled coating,
    wherein the asphalt shingle waste filled coating is located on the substrate;
    wherein the asphalt shingle waste filled coating comprises an oxidized asphalt, an asphalt shingle waste, and a phase modifier,
        wherein the asphalt shingle waste comprises a waste asphalt, a limestone powder, granules, and impurities;
        wherein the phase modifier comprises at least one of a pine chemical additive, a renewable oil, or any combination thereof;
        wherein the oxidized asphalt, the asphalt shingle waste, and the phase modifier are present in an amount sufficient for the asphalt shingle waste filled coating to have at least one of:
        A) a penetration point of 16 dmm to 20 dmm, at 77° F., when tested according to ASTM 3462; or
        B) a softening point of 200° F. to 210° F. when tested according to ASTM D3461.

2. The roofing shingle of claim 1, wherein the asphalt shingle waste comprises:
    60% to 95% by weight of the limestone powder, granules, and impurities based on a total weight of the asphalt shingle waste; and
    5% to 40% by weight of the waste asphalt based on the total weight of the asphalt shingle waste.

3. The roofing shingle of claim 1, wherein the asphalt shingle waste filled coating further comprises:
    at least one filler,
        wherein the at least one filler comprises limestone.

4. The roofing shingle of claim 1, wherein the asphalt shingle waste filled coating has a softening point of 200° F. to 205° F. when tested according to ASTM D3461.

5. The roofing shingle of claim 1, wherein the asphalt shingle waste filled coating has a penetration point of 16 dmm to 19 dmm, at 77° F., when tested according to ASTM 3462.

6. The roofing shingle of claim 1, wherein the asphalt shingle waste filled coating has a penetration point of 16 dmm to 18 dmm, at 77° F., when tested according to ASTM 3462.

7. The roofing shingle of claim 1, wherein the asphalt shingle waste filled coating has a penetration point of 16 dmm to 17 dmm, at 77° F., when tested according to ASTM 3462.

8. The roofing shingle of claim 1, wherein the asphalt shingle waste filled coating has a penetration point of 17 dmm to 20 dmm, at 77° F., when tested according to ASTM 3462.

9. The roofing shingle of claim 1, wherein the asphalt shingle waste filled coating has a penetration point of 18 dmm to 20 dmm, at 77° F., when tested according to ASTM 3462.

10. The roofing shingle of claim 1, wherein the asphalt shingle waste filled coating has a penetration point of 19 dmm to 20 dmm, at 77° F., when tested according to ASTM 3462.

11. A roofing system comprising:
a roofing substrate; and
a plurality of roofing shingles,
    wherein the plurality of roofing shingles is located on the roofing substrate;
    wherein each of the plurality of roofing shingles comprises:
        a substrate,
            wherein the substrate comprises a fiberglass mat; and
        an asphalt shingle waste filled coating,
            wherein the asphalt shingle waste filled coating is located on the substrate;
            wherein the asphalt shingle waste filled coating comprises an oxidized asphalt, an asphalt shingle waste, and a phase modifier,
                wherein the asphalt shingle waste comprises a waste asphalt, a limestone powder, granules, and impurities;
                wherein the phase modifier comprises at least one of a pine chemical additive, a renewable oil, or any combination thereof;
                wherein the oxidized asphalt, the asphalt shingle waste, and the phase modifier are present in an amount sufficient for the asphalt shingle waste filled coating to have at least one of:
                A) a penetration point of 16 dmm to 20 dmm, at 77° F., when tested according to ASTM 3462; or
                B) a softening point of 200° F. to 210° F. when tested according to ASTM D3461.

12. The roofing system of claim 11, wherein the asphalt shingle waste filled coating has a softening point of 200° F. to 205° F. when tested according to ASTM D3461.

13. The roofing system of claim 11, wherein the asphalt shingle waste filled coating has a penetration point of 16 dmm to 19 dmm, at 77° F., when tested according to ASTM 3462.

14. The roofing system of claim 11, wherein the asphalt shingle waste filled coating has a penetration point of 16 dmm to 18 dmm, at 77° F., when tested according to ASTM 3462.

15. The roofing system of claim 11, wherein the asphalt shingle waste filled coating has a penetration point of 16 dmm to 17 dmm, at 77° F., when tested according to ASTM 3462.

16. The roofing system of claim 11, wherein the asphalt shingle waste filled coating has a penetration point of 17 dmm to 20 dmm, at 77° F., when tested according to ASTM 3462.

17. The roofing system of claim 11, wherein the asphalt shingle waste filled coating has a penetration point of 18 dmm to 20 dmm, at 77° F., when tested according to ASTM 3462.

18. The roofing system of claim 11, wherein the asphalt shingle waste filled coating has a penetration point of 19 dmm to 20 dmm, at 77° F., when tested according to ASTM 3462.

19. A roofing shingle comprising:

a substrate, wherein the substrate comprises a fiberglass mat; and an asphalt shingle waste filled coating, wherein the asphalt shingle waste filled coating is located on the substrate;

wherein the asphalt shingle waste filled coating comprises an asphalt shingle waste and a phase modifier, wherein the asphalt shingle waste comprises a waste asphalt, a limestone powder, granules, and impurities;

wherein the phase modifier comprises at least one of a pine chemical additive, a renewable oil, or any combination thereof;

wherein the asphalt shingle waste and the phase modifier are present in an amount sufficient for the asphalt shingle waste filled coating to have at least one of:

A) a penetration point of 16 dmm to 20 dmm, at 77° F., when tested according to ASTM 3462; and B) a softening point of 200° F. to 210° F. when tested according to ASTM D3461.

20. The roofing shingle of claim 19, wherein the asphalt shingle waste filled coating further comprises:

at least one filler, wherein the at least one filler comprises limestone.

* * * * *